(12) United States Patent
Ogura et al.

(10) Patent No.: US 10,509,539 B2
(45) Date of Patent: Dec. 17, 2019

(54) DISPLAY CONTROL DEVICE, NON-TRANSITORY COMPUTER-READABLE MEDIUM, AND CONTAINING INSTRUCTIONS TO CONTROL DISPLAY DEVICE

(71) Applicant: BROTHER KOGYO KABUSHIKI KAISHA, Nagoya, Aichi (JP)

(72) Inventors: Sho Ogura, Aichi (JP); Tomomi Arai, Aichi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 565 days.

(21) Appl. No.: 15/084,594

(22) Filed: Mar. 30, 2016

(65) Prior Publication Data
US 2016/0291812 A1 Oct. 6, 2016

(30) Foreign Application Priority Data
Mar. 30, 2015 (JP) .................. 2015-069512

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0488* (2013.01); *G06F 3/04842* (2013.01);
(Continued)

(58) Field of Classification Search
CPC ........ G06F 11/2221; H04N 2201/0094; H04N 1/00474
See application file for complete search history.

(56) References Cited

U.S. PATENT DOCUMENTS 6,615,346 B1 * 9/2003 Kawamoto ........... G06F 9/4411
345/594
7,057,747 B1 * 6/2006 Minagawa .............. G06F 3/122
358/1.1
(Continued)

FOREIGN PATENT DOCUMENTS

JP 2002-278375 A 9/2002
JP 3793975 B2 7/2006
(Continued)

OTHER PUBLICATIONS

Office Action dated Dec. 25, 2018 received from the Japanese Patent Office in related application JP 2015-069512 together with an English language translation.

*Primary Examiner* — Linh K Pham
(74) *Attorney, Agent, or Firm* — Scully, Scott, Murphy & Presser, P.C.

(57) ABSTRACT

A display control device has a display device, a storage device and a controller. The storage device contains a function selection screen, a function items list screen and a function item setting screen. The controller is configured to set one of the functional items list screen and the functional item setting screen as a first hierarchy screen when one function is selected, retrieve the function selection screen from the storage device and display the same, receive a selection operation to select one of the multiple functions through the function selection screen, and retrieve a screen which is set as the first hierarchy screen from the storage device and displays the retrieved screen on the display device when one of the multiple functions is selected.

11 Claims, 12 Drawing Sheets

(51) Int. Cl.
*G06F 3/0484* (2013.01)
*H04N 1/00* (2006.01)
*G06F 3/0488* (2013.01)
*G06F 9/451* (2018.01)

(52) U.S. Cl.
CPC ......... *G06F 9/451* (2018.02); *H04N 1/00411* (2013.01); *H04N 1/00435* (2013.01); *H04N 1/00474* (2013.01); *H04N 1/00482* (2013.01); *H04N 1/00514* (2013.01); *H04N 1/00517* (2013.01); *H04N 2201/0094* (2013.01)

(56) References Cited

U.S. PATENT DOCUMENTS

| | | | | |
|---|---|---|---|---|
| 8,640,039 B2* | 1/2014 | Saito | .................. | G06F 9/44505 715/765 |
| 9,883,057 B2* | 1/2018 | Kirihara | ............ | H04N 1/00514 |
| 2002/0054146 A1 | 5/2002 | Fukumoto et al. | | |
| 2003/0007181 A1* | 1/2003 | Nishikawa | ............. | G06K 15/02 358/1.18 |
| 2004/0111675 A1* | 6/2004 | Mori | .................... | G06F 17/211 715/234 |
| 2005/0073709 A1* | 4/2005 | Kujirai | ................. | G06F 3/1222 358/1.14 |
| 2005/0111866 A1* | 5/2005 | Sato | ................... | G03G 15/5016 399/79 |
| 2005/0134871 A1* | 6/2005 | Nakagiri | ........... | H04N 1/00803 358/1.6 |
| 2005/0286090 A1* | 12/2005 | Ahne | ................. | H04N 1/00384 358/452 |
| 2006/0007469 A1* | 1/2006 | Uruma | ................. | H04N 1/0035 358/1.14 |
| 2008/0291485 A1* | 11/2008 | Kimoto | ............. | H04N 1/00222 358/1.15 |
| 2010/0064064 A1* | 3/2010 | Koizumi | ................ | G06F 3/0488 710/13 |
| 2012/0030605 A1* | 2/2012 | Nakanishi | .......... | H04N 1/00411 715/773 |
| 2012/0099128 A1 | 4/2012 | Yoshida et al. | | |
| 2012/0257244 A1 | 10/2012 | Hara | | |
| 2013/0208306 A1* | 8/2013 | Fukasawa | ............. | G06F 3/1205 358/1.15 |
| 2014/0268225 A1* | 9/2014 | Shibukawa | ......... | H04N 1/00204 358/1.15 |
| 2014/0327787 A1* | 11/2014 | Tsujimoto | .......... | H04N 1/32112 348/207.2 |
| 2014/0355047 A1* | 12/2014 | Lee | ....................... | G06F 3/1292 358/1.15 |
| 2015/0085325 A1* | 3/2015 | Sato | ................... | H04N 1/00411 358/444 |
| 2015/0156348 A1* | 6/2015 | Kittaka | ............ | H04N 1/00307 358/1.14 |
| 2015/0172487 A1* | 6/2015 | Kirihara | ............ | H04N 1/00514 358/1.14 |
| 2015/0261478 A1* | 9/2015 | Obayashi | ........... | H04N 1/00896 358/1.15 |

FOREIGN PATENT DOCUMENTS

| | | |
|---|---|---|
| JP | 2009 098966 A | 5/2009 |
| JP | 2012-221068 A | 11/2012 |
| JP | 2013-153492 A | 8/2013 |

* cited by examiner

DISPLAY CONTROL DEVICE, NON-TRANSITORY COMPUTER-READABLE MEDIUM, AND CONTAINING INSTRUCTIONS TO CONTROL DISPLAY DEVICE

CROSS-REFERENCE TO RELATED APPLICATION

The present application claims priority under 35 U.S.C. § 119 from Japanese Patent Application No. 2015-069512 filed on Mar. 30, 2015. The entire subject matter of the application is incorporated herein by reference.

BACKGROUND

Technical Field

The present disclosures relate to a display control device configured to display one of multiple kinds of screens on a display device. The present disclosures further relate to a display control method employed in such a display device, and a non-transitory computer-readable medium storing instructions which realizes, when executed by a computer, such a method.

Related Art

An MFP (multi-function peripheral) having multiple main functions such as a printing function, a scanning function and the like, is typically configured such that a user can select one main function to be used on a standby screen. When the user selects one of the main functions through the standby screen, typically multiple sub-functions corresponding to the selected main function are displayed as a list. For example, when the user selects the printing function, a collective printing, a both-side printing and the like are displayed as the sub-functions. The collective printing function is a function to print images respectively corresponding multiple pages are collectively printed on the same surface of a single printing sheet, and the both-side printing function is a function to print two images which respectively correspond to two pages on both surface of the same printing sheet.

When a user selects one sub-function from among the sub-functions listed in the screen, typically, a detail setting screen showing a current setting status of the selected sub-function is displayed. In such a case, the user can confirm the current setting status of the selected sub-function through the detail setting screen.

SUMMARY

Depending on the user, almost the same sub-functions are used more frequently than the others. For example, given that there is a user who usually uses the both-side print function when he/she uses the printing function. For such a user, it is troublesome to select the both-side print function from the list of sub-functions every time he/she selects the print function through the standby screen, and such a configuration is not operable.

Aspects of the disclosures provide an improved configuration in which screens transit to an appropriate one according to user's tendency of usage of the sub-functions when the user selects a main function through a function selecting screen (e.g., a standby screen).

According to aspects of the disclosures, there is provided a display control device, which has a display device configured to display an image, a storage device, and a controller. The storage device is configured to store a function selection screen to select one function of multiple functions, a function items list screen to one item of functional items which are related to the one function selected in the function selection screen, and a functional item setting screen, which corresponds to individual one of the multiple function items, including at least settings of a corresponding functional item. The controller is configured to set one of the functional items list screen and the functional item setting screen as a first hierarchy screen to be displayed on the display device when one function is selected in the function selection screen, retrieve the function selection screen from the storage device and display the retrieved function selection screen on the display device, receive a selection operation to select one of the multiple functions through the function selection screen displayed on the display device, and retrieve a screen which is set as the first hierarchy screen, from among the function items list screen and the function item setting screen from the storage device and display the retrieved screen on the display device when one of the multiple functions is selected.

According to aspects of the disclosures, there is further provided a non-transitory computer-readable medium for a display control device, having a display device configured to display an image, a storage device configured to store a function selection screen to select one function of multiple functions, a function items list screen to one item of functional items which are related to the one function selected in the function selection screen, and a functional item setting screen, which corresponds to individual one of the multiple function items, including at least settings of a corresponding functional item, and a controller. The non-transitory computer-readable medium contains instructions which, when executed by the controller, causes the display control device to set one of the functional items list screen and the functional item setting screen as a first hierarchy screen to be displayed on the display device when one function is selected in the function selection screen, retrieve the function selection screen from the storage device and display the retrieved function selection screen on the display device, receive a selection operation to select one of the multiple functions through the function selection screen displayed on the display device, and retrieve a screen, which is set as the first hierarchy screen, from among the function items list screen and the function item setting screen from the storage device and display the retrieved screen on the display device when one of the multiple functions is selected.

According to aspects of the disclosures, there is provided a display control device, which has a display, a controller and a storage storing first data for displaying a first screen on the display, second data for displaying a second screen on the display and third data for displaying a third screen on the display, the first screen indicating multiple functions, the second screen indicating a list of multiple functional items related to a particular function, the particular function being one of the multiple functions, the third screen indicating settings of a particular functional item, the particular functional item being one of the multiple functional items. The controller is configured to set one of the second screen and the third screen as a first hierarchy screen to be displayed on the display when the particular function is selected in the first screen, retrieve the first data of the first screen from the storage and display the retrieved first screen indicating the multiple functions on the display, receive a selection of the particular function while displaying the multiple function indicated in the first screen, in response to receiving the selection of the particular function, retrieve particular data, which is one of the second data of the second screen and the third data of the third screen from the storage, wherein the retrieved particular data corresponds to the one of the second screen and the third screen as the first hierarchy screen, and display the one of the second screen and the third screen on the display based on the retrieved particular data.

BRIEF DESCRIPTION OF THE ACCOMPANYING DRAWINGS

DETAILED DESCRIPTION OF ILLUSTRATIVE EMBODIMENT

Hereinafter, referring to the accompanying drawings, an image processing system according to an illustrative embodiment of the disclosures will be described.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storages, hard disk drives, floppy drives, permanent storages, and the like.

(1) Configuration of Image Processing System

Figure 1:
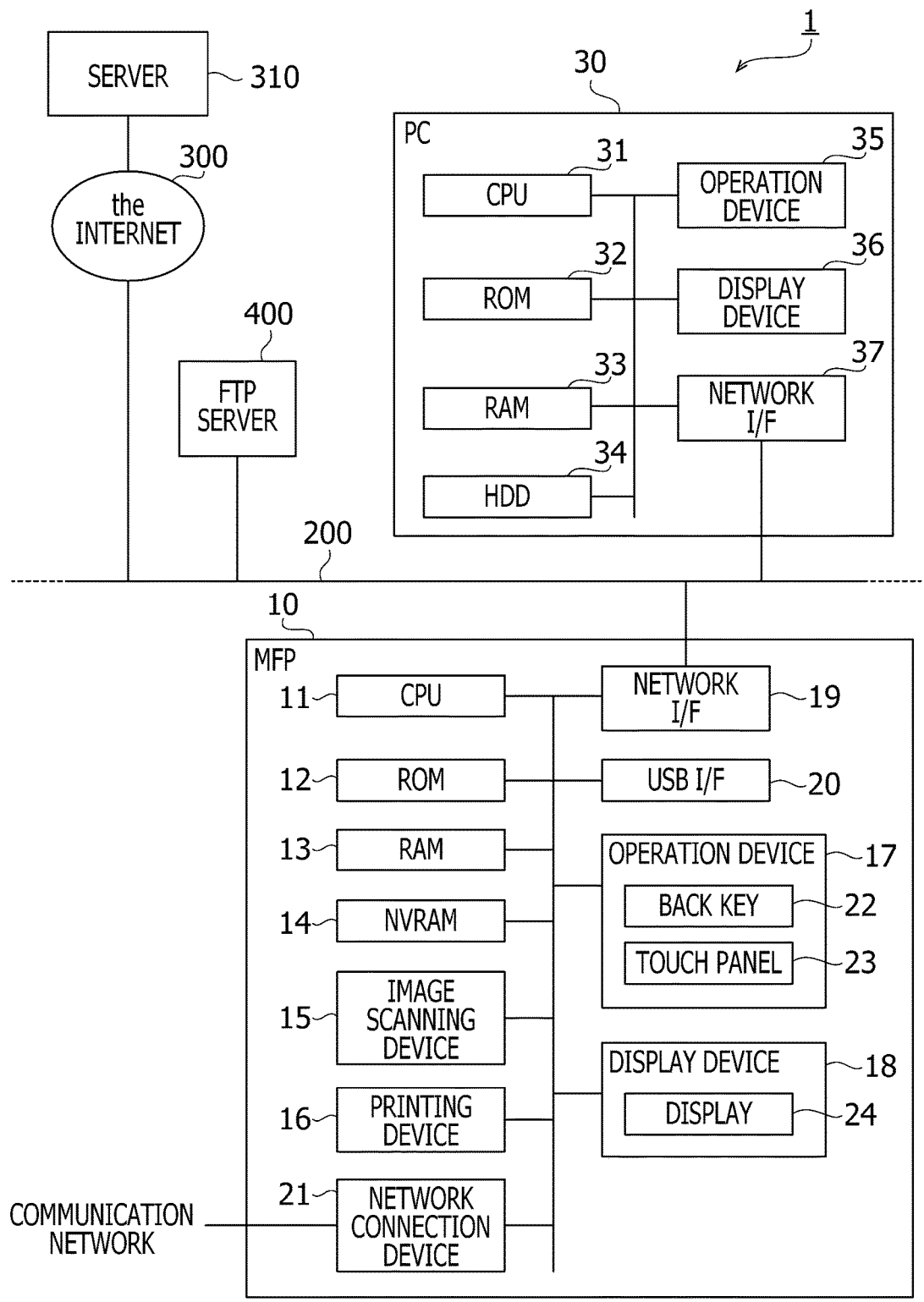
FIG. 1 is a block diagram schematically showing a configuration of an image processing system according to an illustrative embodiment of the disclosures.

As shown in FIG. 1, an image processing system 1 according to an illustrative embodiment of the disclosures has an MFP (multi-function peripheral) 10 and a PC (personal computer) 30. The MFP 10 and the PC 30 are configure to execute data communication with each other through a LAN (local area network) 200.

The MFP 10 has multiple main functions such as a printing function to print images on printing sheets, a scanning function to scan images on original sheets, a copying function to print images scanned with use of the scanning function onto the printing sheets, a facsimile function to transmit/receive facsimile data.

The MFP 10 has a CPU (central processing unit) 11, a ROM (read only memory) 12, a RAM (random access memory) 13, an NVRAM (non-volatile RAM) 14, an image scanning device 15, a printing device 16, an operation device 17, a display device 18, a network I/F (interface) 19, a USB (universal serial bus) I/F 20 and a network connection device 21.

The CPU 11 executes controlling of respective components inside the MFP 10 and various calculations/operations in accordance with programs stored in the ROM 12 and NVRAM 14. The RAM 13 is generally used as a main memory which is directly accessed by the CPU 11. The NVRAM 14 is an electrically rewritable non-volatile memory, and stores setting information for the MFP 10. Programs corresponding to processes shown in FIGS. 9-12 are stored in the ROM 12 or NVRAM 14. Further, data for displaying screens on the display device 18 is also stored in the ROM 12 or the NVRAM 14. Thus, displaying of the screens, which will be described later, is realized as the CPU 11 retrieves the data representing a screen to be displayed from the ROM 12 or the NVRAM 14, and display the same on the display device 18.

The image scanning device 15 is a component configure to execute the scanning function and a part of the copying function (i.e., scanning of the original sheets). The image scanning device 15 has an image sensor, scans images on the respective original sheets and generates image data representing the scanned images.

The printing device is a component configured to execute the printing function and a part of the copying function (i.e., printing of the scanned image). The printing device 16 has a function of printing various pieces of image data including one generated by the image scanning device 15 on the printing sheets.

The display device 18 has a display (e.g., an LCD: liquid crystal display) which is a device capable of displaying information. The operation device 17 is an input device configured to receive an input operation by the user. The operation device 17 has input devices such as operation buttons including a back key 22, a touch panel 23, and the like. As the back key 22 is depressed, the screen displayed on the display 24 is switched to a preciously displayed screen (e.g., to a screen which belongs to an higher hierarchy with respect to a current hierarchy to which currently displayed screen belongs). The touch panel 23 is overlaid on a display area of the display 24.

The network I/F 19 is an interface used to connect the MFP 10 to the LAN 200. The USB I/F 20 is an interface used to execute data communication in accordance with a well-known USB standard. The network connection device 21 is an interface used to execute data communication with an external device through a communication network (e.g., a public telephone network). Facsimile data transmission/reception of the facsimile function is executed through the network connection device 21.

The PC 30 has a CPU 31, a ROM 32, a RAM 33, an HDD (hard disc drive) 34, an operation device 35, a display device 36, and a network I/F 37.

The CPU 31 controls operations of components of the PC 30 and external device (including the MFP 10) by executing programs stored in ROM 32 and/or HDD 34. The ROM 32 stores programs executed by the CPU 31 and data. The RAM 33 is used as a main memory when the CPU 31 executes various processes. In the HDD 34, an OS (operating system), device drivers, application software and the like are installed. The operation device 35 is provided with a keyboard, and pointing devices. The display device 36 has a display such as a liquid crystal display or an organic EL (electroluminescence) display. The network I/F 37 is a communication interface used to connect the PC 30 with the LAN 200.

To the LAN 200, an FTP (file transfer protocol) server 400 is connected. The LAN 200 is also connected with the Internet 300. To the Internet 300, multiple information processing apparatuses including a server 310 are connected. The MFP 10, the PC 30 and the FTP server 400 are configured to execute data communication with each other through the LAN 200. Further, the MFP 100, the PC 30 and the FTP server 400 are configured to execute data communication with the information processing apparatuses connected to the Internet 300.

(2) Function of MFP 10

As mentioned above, the MFP 10 has multiple main functions including the scanning function, the copying function and the facsimile function.

(2-1) Sub-Functions of Scanning Function

Among the multiple main functions, the scanning function can be subdivided into multiple sub-functions corresponding to processing methods of the data of the scanned image. According to the illustrative embodiment, the scanning functions can be subdivided to sub-functions of a scan-to-OCR (optical character recognition), a scan-to-file function, a scan-to-FTP, a scan-to-medium, a scan-to-network, and the like.

The scan-to-OCR sub-function is a function of converting a scanned image to text data, transmitting the converted text data to a PC (e.g., the PC 30) connected to the MFP 10, and causing the PC to store the text data in a designated folder in the PC.

The scan-to-file sub-function is a function of transmitting the data of the scanned image (hereinafter, referred to as scan data) to the PC connected to the MFP 10, and causing the PC to store the scan data in a designated folder in the PC.

The scan-to-FTP sub-function is a function of transmitting the scan data to a particular FTP server (e.g., the FTP server 400) and causing the FTP server to store the scan data.

The scan-to-network sub-function is a function of transmitting the scan data to a PC or a server connected to the Internet and causing the PC of the server to store the scan data.

The scan-to-medium sub-function is a function of storing the scan data in a non-transitory recording medium such as a memory card, an USB memory and the like. With this scan-to-medium function, the MFP 10 can store the scan data in a USB memory connected to the USB I/F 20.

(2-2) Sub-Functions of Copying Function

Among the multiple main functions, the copying function can be subdivided into multiple sub-functions in accordance with employed copying methods. According to the illustrative embodiment, the copying function can be subdivided to a standard copying, a single-to-double side copying, an ID (identification) copying, a 2-in-1 copying, an ink-saving copying and the like.

The standard copying sub-function is a function of executing a standard copying which is a copying according to standard copy settings so that an image on a single original sheet is copied onto a single printing sheet without using particular settings such as a magnification/reduction, improvement of image quality, ink-saving or the like. The setting values of respecting setting items used in the standard copying may have been set before the MFP 10 is shipped. It is noted that such settings can also be changed arbitrarily in later stages.

The single-to-double side copying function is a function of scanning images of two pages of original sheets and printing the scanned images for two pages onto both sides of one printing sheet. The ID copying function is a function of scanning both sides of a card-size original sheet and printing the same on the same page (i.e., the same surface) of one printing sheet in an arranged manner.

The 2-in-1 copying function is a function of scanning images of two pages of original sheets and printing the scanned images on the same surface of one printing sheet in an arranged manner.

The ink-saving copying function is a function of suppressing consumption of the ink by lightly printing inner portions of letter, characters and images.

It is noted that the sub-functions described above are so-called preset copying functions. The preset copying functions are functions respectively enabling multiple kinds of particular copying functions efficiently. That is, according to the illustrative embodiment, setting information of each of the particular copying functions is registered in advance. Thus, the user can cause the MFP 10 to execute a copying function corresponding to any one of the registered copying functions by simply selecting the same. It is further noted that the user can modify the setting information of the registered preset copying functions. Therefore, the user can modify setting information of a certain preset copying function to so that the modified setting information is similar to the setting information of another preset copying function.

(3) Transition of Screens (3-1) General Description of Screen Transition

Figure 2:
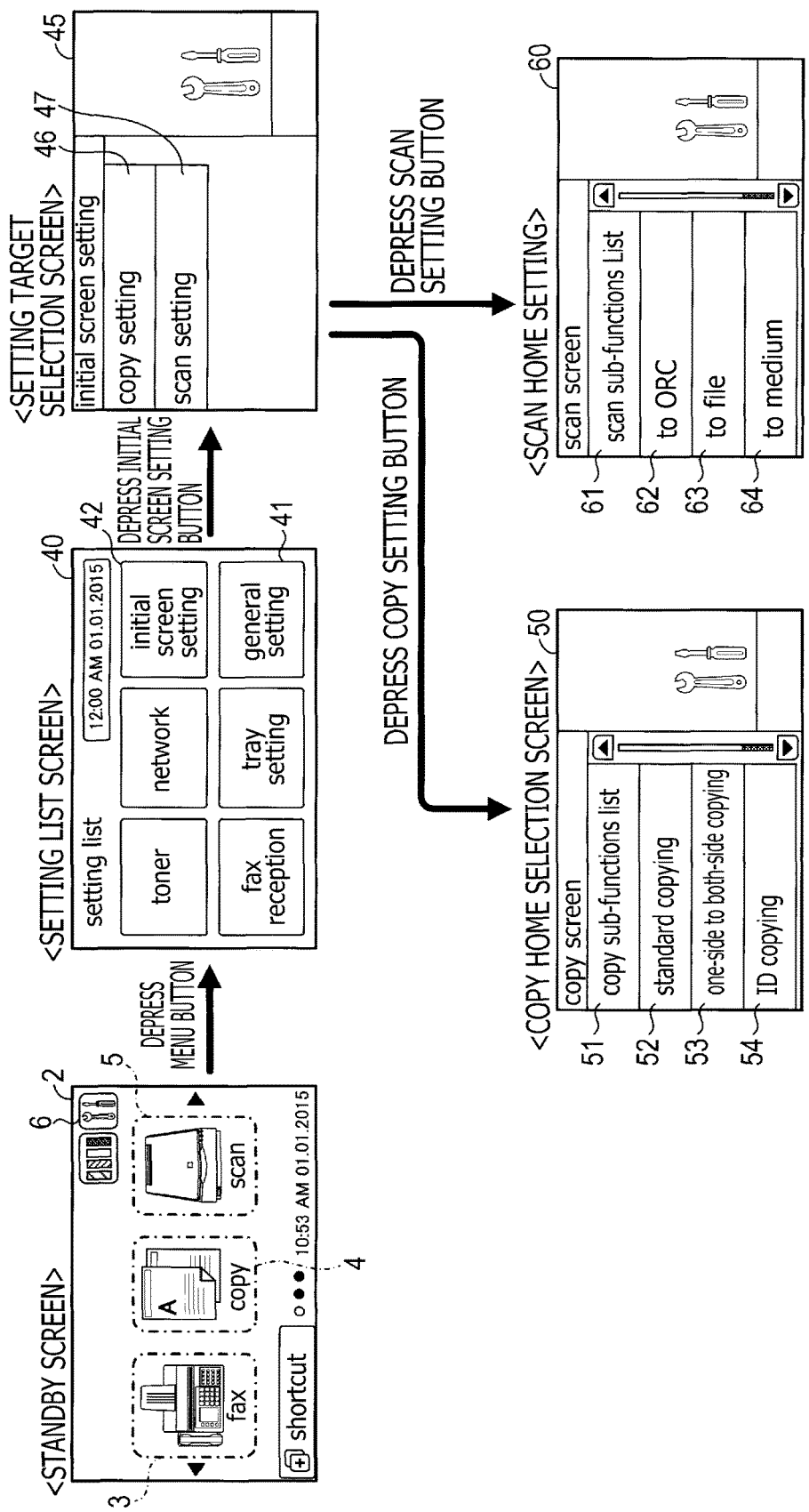
FIG. 2 illustrates a transition of screens when setting of a function home screen is executed according to the illustrative embodiment of the disclosures.

When the MFP 10 is powered on and initializing processes are finished, a standby screen 2 as shown in FIG. 2 is displayed on the display 24 of the MFP 10.

On the standby screen 2, multiple main function buttons 3, 4 and 5 are displayed. In a case shown in FIG. 2, a fax button 3, a copy button 4 and a scan button 5 are displayed on the standby screen 2. The types of the main function buttons to be displayed on the display 24 can be switched with a particular operation with respect to the touch panel 23 (e.g., a flick operation in right-left direction). For example, by depressing one of the main function buttons, the user can cause the operation status of the MFP 10 to proceed to a next step to execute the main function corresponding to the selected (i.e., depressed) main function button. It is noted that, throughout the specification, a term "depress" is used to describe a tapping operation onto the touch panel 23 at an area corresponding to a button which is displayed on a screen.

Further, on the standby screen 2, a menu button 6 is displayed. When the menu button 6 is depressed, as shown in FIG. 2, a setting list screen 40 used to make various settings of the MFP 10 is displayed.

In the standby screen 2, when the user depresses one of the main function buttons 3, 4 or 5, the screen displayed on the display 24 transits to a function home screen which is a lower hierarchy function than the main function. In the following description, the screen to which the screen transits from the standby screen 2 when one of the main function buttons is depressed will be referred to as a first hierarchy screen. Similarly, a screen to which the displayed screen transits from the first hierarchy screen when a button on the first hierarchy screen is depressed will be referred to as a second hierarchy screen.

According to the illustrative embodiment, as the first hierarchy screen (i.e., the function home screen), to which the screen transits when one of the main function buttons is depressed on the standby screen, a sub-functions list screen displaying a list of sub-functions corresponding to the selected main function is displayed according to a default setting. When the user selects one of the sub-functions listed in the sub-function list screen, the screen transits to a setting screen for the sub function as a second hierarchy screen.

According to the illustrative embodiment, a setting screen for a particular sub-function can be displayed as the first hierarchy function home screen instead of the sub-function list screen. For example, the user can select one of the sub-functions list screen corresponding to the depressed main function, and a setting screen for the particular sub-function of the selected main function, as a screen to which the displayed screen transits when the user depressed one of the main function buttons 3, 4 and 5. When the setting screen for the particular sub-function has been selected in advance as the function home page for a certain main function button, the setting screen for the particular sub-function can be displayed in response to depression of the main function button.

Hereinafter, setting of the first hierarchy function home screen in response to depression of the main function button, and transition of the screens in accordance with the setting will be described, referring to FIGS. 2-6.

(3-2) Setting of Function Home Screen (First Hierarchy)

A method of setting the first hierarchy function home screen in response to depression of the main function button will be described referring to FIG. 2. When the user depresses a menu button 6 on the standby screen 2, the setting list screen 40 is displayed. Within the setting list screen 40, buttons for settings regarding the toner, the network and the like are arranged, and among which, an initial screen setting button 42 is included. When the user depressed the initial screen setting button 42, a setting target selection screen 45 is displayed.

It is noted that a general setting button 41 is displayed in the setting list screen 40. By depressing the general setting button 41, the setting target selection screen 45 can also be displayed after some procedures and screen transitions.

The setting target selection screen 45 is a screen which encourages the user to select the main function, from among the multiple main functions, to which the first hierarchy function home screen is set. In the setting target selection screen 45, a copy setting button 46 and the scan setting button 47 are displayed. It is noted that, in the setting target screen 45, setting buttons other than the copy setting button 46 and the scan setting button 47 are displayed as buttons corresponding to respective main functions, which are analogous to the copy setting button 46 and the scan setting button 47, and will not be described in detail for brevity.

When the copy setting button 46 is depressed in the setting target selection screen 45, a copy home selection screen 50 encouraging the user to select a first hierarchy function home screen corresponding to the copying function is displayed. Such a function home screen will also be referred to as a copy home screen.

In the copy home selection screen 50, multiple buttons including a copy sub-functions list button 51, a standard copying button 52, a one-side to both-side copying button 53, an ID copying button 54 are displayed.

When the copy sub-functions list button 51 is depressed, a copy sub-functions list screen 70 (see FIG. 3) is set as the copy home screen. Buttons other than the copy sub-function list button 51 are also buttons corresponding to particular sub-functions, respectively, and, when depressed, particular screens corresponding to respective sub-functions are set. For example, when the user depressed the standard copying button 52, a standard copy setting screen 76 (see FIG. 3) through which confirmation and changing of setting statuses regarding the standard copying, which is one of the sub-functions, is set as the copy home screen. For another example, when the user depresses the ID copying button 54, an ID copy setting screen (not shown) corresponding to an ID copying, which is one of the sub-functions, is set as the copy home screen.

As described above, when the user depresses, in the copy home selection screen 50, one of the buttons corresponding to the screen which the user wants to set as the copy home screen, the copy home screen is set to be a screen corresponding to the button (the sub-functions list screen 70 or another sub-function setting screen). With this configuration, when the user depresses the copy button 4 in the standby screen 2, the copy home screen set as the first hierarchy screen is displayed.

When a setting screen for a sub-function other than the copy sub-function lest screen 70 as the copy home screen, a setting screen of the set sub-function is set as the first hierarchy screen. Further, in such a case, the setting screens for all the sub-functions of the copying function will be defined as the first hierarchy screen. For example, when the standard copy setting screen 76 is set to be the copy home screen by depressing the standard copying button 52, the setting screens of all the sub-functions of the copying function is set to be the first hierarchy screen of the copying function.

When the scan setting button 47 is depressed in the setting target selection screen 45, a scan home selection screen 60 encouraging the user to select a first hierarchy function home screen for the scanning function (hereinafter, referred to as a scan home screen 60) is displayed.

In the scan home selection screen 60, multiple buttons including a scan sub-function list button 61, a file button 63 and a medium button 64 are displayed.

By depressing the scan sub-function list button 61, the user can set the scan sub-function list screen 90 (see FIG. 5) as the scan home screen.

Buttons other than the scan sub-functions list button 61 correspond to other particular sub-functions, respectively, and used as the buttons so set the scan home screen to be one of respective sub-functions setting screens. For example, by depressing the file button 63, a scan-to-file setting screen 96 (see FIG. 5) which is used to confirm and/or modify setting statuses regarding the scan-to-file function, which is one of the sub-functions, can be set as the scan home screen. For another example, by depressing the medium button 64, a scan-to-medium setting screen (not shown) corresponding to the scan-to-medium function which is one of the sub-functions can be set as the scan home screen.

As described above, by depressing one of the buttons corresponding to the screen the user wishes to set as the scan home screen in the scan home selection screen 60, the scan home screen can be set to be the screen (i.e., the sub-function list screen 90 or one of the sub-function setting screen) corresponding to the depressed button. Then, when the scan button 5 is depressed in the standby screen 2, the thus set scan home screen can be displayed as the first hierarchy screen.

It is noted that, when one of the sub-function setting screen is set instead of the scan sub-function list screen 90 as the scan home screen, not only the set sub-function setting screen is set as the first hierarchy screen, but all the sub-function setting screens in the scanning function are set as the first hierarchy screens. For example, when the scan-to-file button 63 is depressed so that the scan-to-file setting screen 96 is set as the scan home screen, all the sub-function setting screens of the scanning function are set as the first hierarchy screens.

(3-3) Screen Transition when Main Function Button is Depressed

Next, a transition of the screens when the main function button is depressed in the standby screen 2 will be described.

(3-3-1) when Copy Button is Depressed

Figure 3:
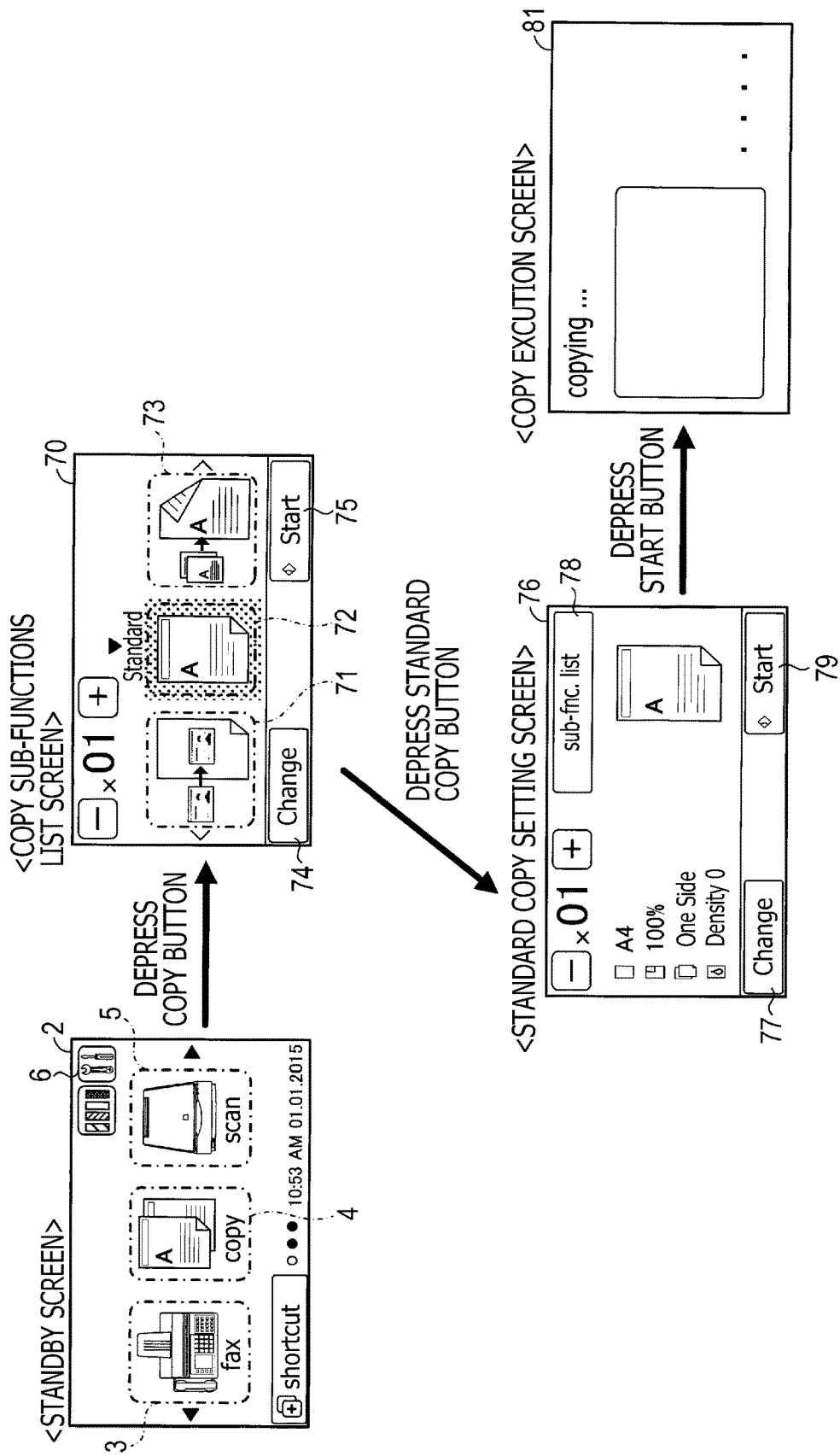
FIG. 3 illustrates a transition of screens when a copy home screen is set to be a copy sub-functions list screen according to the illustrative embodiment of the disclosures.

When the copy sub-functions list screen 70 is set as the first hierarchy copy home screen for the copying function, the copy sub-functions list screen 70 is displayed as shown in FIG. 3 upon depression of the copy button 4 in the standby screen 2.

In the copy sub-functions list screen 70, multiple sub-function buttons respectively corresponding to multiple sub-functions of the copying function, a change button 74 for change setting, and a start button 75 are displayed. In an example shown in FIG. 3, as the multiple sub-function buttons, the ID copy button 71, the standard copy button 72, and the both-side copy button 73 are displayed. Kinds of sub-function buttons displayed on the copy sub-functions list screen 70 can be changed, for example, by a flick operation in the right-left direction with respect to the touch panel 23.

In the copy sub-functions list screen 70 shown in FIG. 3, initially, a central one of three sub-function buttons (i.e., the standard copy button 72) is in a selected state. In this state, by depressing the change button 74, setting values of respective setting items regarding the selected sub-function can be changed. Further, by depressing the start button 75 when a sub-function is being selected, the sub-function in the selected state is executed. In the example shown in FIG. 3, since the standard copy button 72 is in the selected state, by depressing the start button 75, the standard copy function is executed (i.e., copying according to the current standard copy settings is executed).

In the copy sub-functions list screen 70, when one of the multiple sub-function buttons is depressed, a setting screen for the sub-function corresponding to the depressed sub-function button is displayed as a second hierarchy screen. As shown in FIG. 3, if, for example, the standard copy button 72 is depressed in the copy sub-functions list screen 70, a standard copy setting screen 76 corresponding to the standard copy function is displayed.

In the standard copy setting screen 76, current setting values of respective setting items for the standard copy function, a change button 77 for changing the setting values, a copy sub-functions list button 78, and a start button 79 are displayed.

The user can recognize the current setting status for the standard copy function from the displayed contents in the standard copy setting screen 76. Further, by depressing the change button 77, the user can change the setting values of respective setting items for the standard copy function. Further, by depressing the copy sub-functions list button 78, the copy sub-functions list screen 70 can be displayed. In the above case, transition from the standard copy setting screen 76 to the copy sub-functions List screen 70 is not transition from the second hierarchy to a lower hierarchy. Since the copy sub-functions list screen 70 is set to be the first hierarchy screen, the transition above is one from the second hierarchy to the first hierarchy.

Further, when the user depresses the start button 75, the standard copy function is executed. When the standard copy function is being executed, a copy execution screen 81 indicating that the standard copy is being executed is displayed as shown in FIG. 3.

Figure 4:
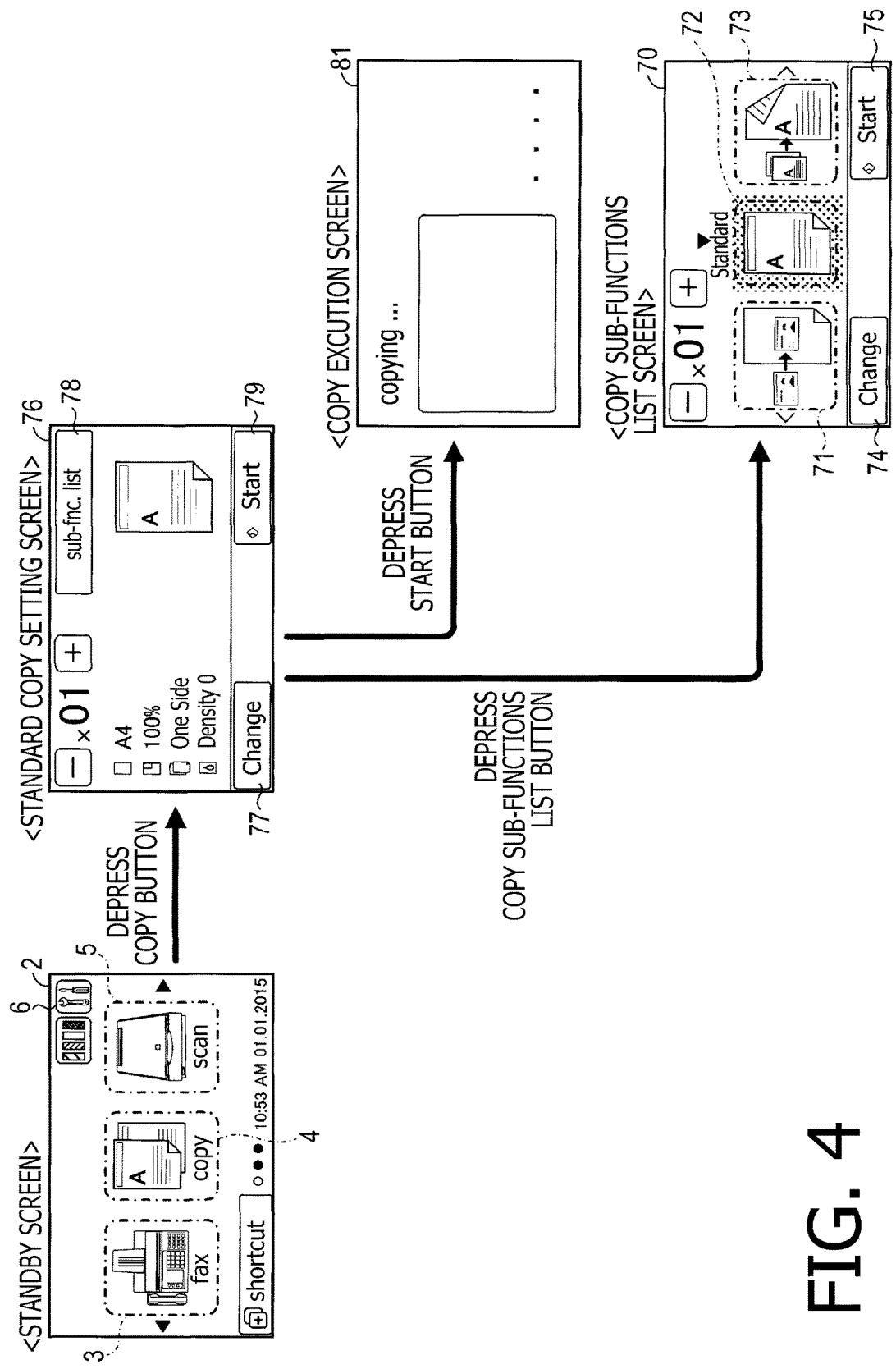
FIG. 4 illustrates a transition of screens when a copy home screen is set to be a setting screen of a particular sub-function (e.g., a standard copy setting screen) according to the illustrative embodiment of the disclosures.

When a setting screen of a particular sub-function from among the multiple sub-functions available in the copying function is set as the first hierarchy copy home screen for the copying function, the setting screen for the particular sub-function is displayed upon depression of the copy button 4 in the standby screen 2. FIG. 4 shows an example in which the standard copy setting screen 76 is set as the first hierarchy copy home screen. In this example, when the copy button 4 is depressed in the standby screen 2, the standard copy setting screen 76 is displayed as the first hierarchy copy home screen.

The standard copy setting screen 76 in FIG. 4 is the same as the standard copy setting screen 76 in the example shown in FIG. 3, although hierarchies are different. Similarly to the case shown in FIG. 3, by depressing the start button 79, the standard copy can be started. Further, by depressing the copy sub-functions list button 78, the copy sub-functions list screen 70 can be displayed. It is noted that transition from the standard copy setting screen 76 to the copy sub-functions list screen 70 in this case is transition from the first hierarchy screen to the second hierarchy screen.

(3-3-2) when Scan Button is Depressed

Figure 5:
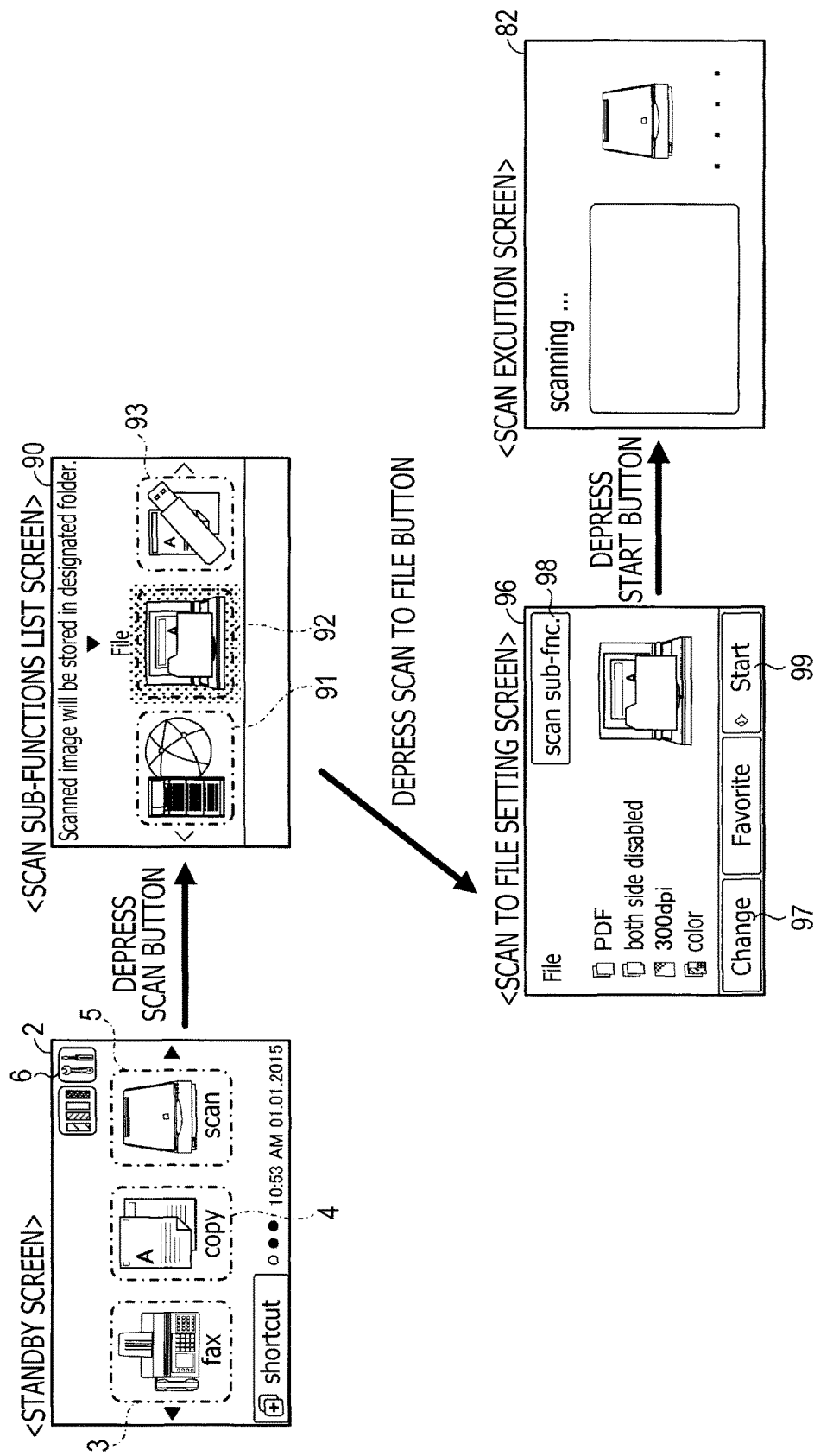
FIG. 5 illustrates a transition of screens when a scan home screen is set to be a scan sub-function list screen according to the illustrative embodiment of the disclosures.

When the scan sub-functions list screen is set as the first hierarchy scan home screen for the scanning function, the scan sub-functions list screen 90 is displayed as shown in FIG. 5 upon depression of the scan button 5 in the standby screen 2.

In the scan sub-functions list screen 90, multiple sub-function buttons respectively corresponding to sub-functions of the scanning function are displayed. In an example shown in FIG. 5, as the multiple sub-function buttons, a scan-to-FTP button 91, a scan-to-file button 92 and a scan-to-medium button 93 are displayed. Kinds of sub-function buttons displayed on the scan sub-functions list screen 90 can be changed, for example, by a flick operation in the right-left direction with respect to the touch panel 23.

In the scan sub-functions list screen 90, when one of the multiple sub-function buttons is depressed, a setting screen for the sub-function corresponding to the depressed sub-function button is displayed as a second hierarchy screen. As shown in FIG. 5, if, for example, the scan-to-file button 92 is depressed in the scan sub-functions list screen 90, a scan-to-file setting screen 96 corresponding to the scan-to-file function is displayed.

In the scan-to-file setting screen 96, current setting values of respective setting items for the scan-to-file function, a change button 97 for changing the setting values, a scan sub-function switching button 98, and a start button 99 are displayed.

The user can recognize the current setting status for the scan-to-file function from the displayed contents in the scan-to-file setting screen 96. Further, by depressing the change button 97, the user can change the setting values of respective setting items for the scan-to-file function. Further, by depressing the scan sub-functions list button 98, the scan sub-functions list screen 90 can be displayed. In the above case, transition from the scan-to-file setting screen 96 to the scan sub-functions list screen 90 is not transition from the second hierarchy to a lower hierarchy. Since the scan sub-functions list screen 90 is set to be the first hierarchy screen, the transition above is one from the second hierarchy to the first hierarchy.

Further, when the user depresses the start button 99, the scan-to-file function is executed. When the scan-to-file function is being executed, a scan execution screen 82 indicating that the scanning function is being executed is displayed as shown in FIG. 5.

Figure 6:
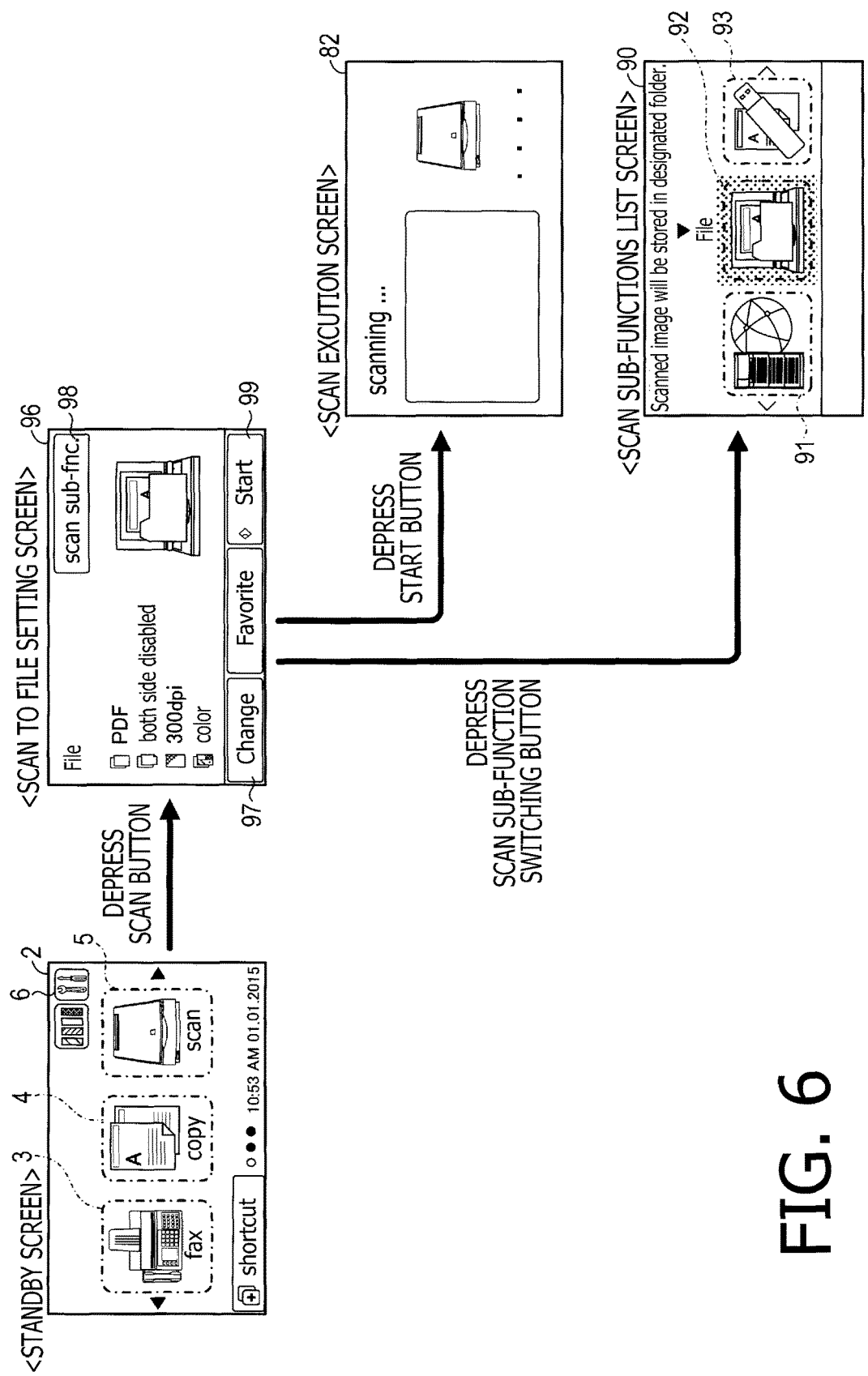
FIG. 6 illustrates transition of screens when a scan home screen is set to be a setting screen for a particular sub-function (e.g., a scan to file setting screen) according to the illustrative embodiment of the disclosures.

When a setting screen of a particular sub-function from among the multiple sub-functions available in the scanning function is set as the first hierarchy scan home screen for the scanning function, the setting screen for the particular sub-function is displayed upon depression of the scan button 5 in the standby screen 2. FIG. 6 shows an example in which the scan-to-file setting screen 96 is set as the first hierarchy scan home screen. In this example, when the scan button 5 is depressed in the standby screen 2, the scan-to-file setting screen 96 is displayed as the first hierarchy copy home screen.

The scan-to-file setting screen 96 in FIG. 6 is the same as the scan-to-file setting screen 96 in the example shown in FIG. 5, although hierarchies are different. Similarly to the case shown in FIG. 5, by depressing the start button 99, the scan-to-file function can be started. Further, by depressing the scan sub-functions list button 98, the scan sub-functions list screen 90 can be displayed. It is noted that transition from the scan-to-file setting screen 96 to the scan sub-functions list screen 90 in this case is a transition from the first hierarchy screen to the second hierarchy screen.

(3-4) Screen Transition when Back Key is Depressed

Next, a transition of screens when the back key 22 is depressed will be described, referring to FIGS. 7 and 8. The back key 22 is basically is a depressible button which is used to change the presently displayed screen to the previously displayed screen. It is noted that, the back key 22 basically changes the displayed screen to the previous screen. It is noted that, although the back key 22 basically changes the screen to the previously displayed screen, the back key 22 actually transits the screen from the presently displayed one to a higher hierarchy screen which is a hierarchy higher than the presently displayed screen by one level.

Therefore, when the hierarchy of the current screen is lower than that of the previous screen, by depressing the back key, the screen can be returned to the previous one which belongs to a higher hierarchy by one level. In contrast, when the hierarchy of the current screen is higher than that of the previous screen, even by depressing the back key 22, the screen is not returned to the previous screen, but switched to a screen which belongs to a higher hierarchy by one level.

Figure 7:
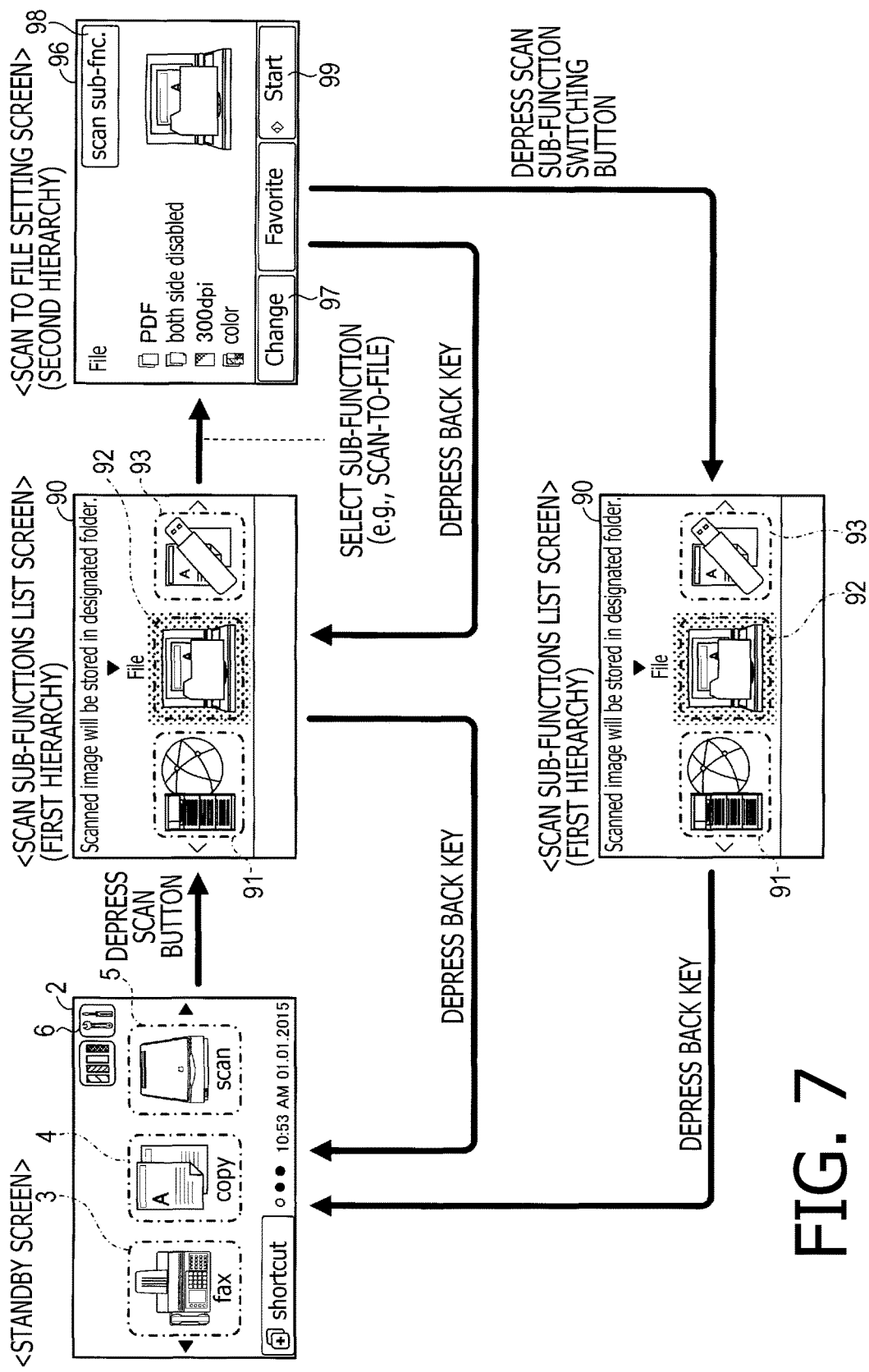
FIG. 7 illustrates a transition of screens when a function home screen is set to be a sub-function list screen and a back key is depressed according to the illustrative embodiment of the disclosures.

When the scan sub-functions list screen 90 is set as the scan home screen (first hierarchy) for the scanning function, as shown in FIG. 7, by depressing the scan button 5, the scan sub-functions list screen 90, which is the scan home screen, is displayed. When the back key 22 is depressed with the scan sub-functions list screen 90 being displayed, the screen is returned to the standby screen 2 which belongs to an higher hierarchy as is also a previous screen.

When one of the multiple sub-function buttons, for example, the scan-to-file button 92 is depressed after the screen is transited from the standby screen 2 to the scan sub-functions list screen 90, the scan-to-file setting screen 96, which is the second hierarchy screen, is displayed.

When the back key 22 is depressed with the scan-to-file setting screen 96 being displayed, the screen returns to the scan sub-functions list screen 90 which is a higher hierarchy screen by one level, and is also a previous screen.

By depressing the scan sub-function switching button 90 in the scan-to-file screen 96, the screen transits to the scan sub-functions list screen 90. This transition to the scan sub-functions list screen 90 is, as mentioned above, not a transition to a lower hierarchy, but a transition to the first hierarchy. Therefore, when the back key 22 is depressed after the screen transited to the scan sub-functions list screen 90, the screen does not return to the previous one (i.e., the scan-to-file setting screen 96) but to the standby screen which is the higher hierarchy screen by one level.

Figure 8:
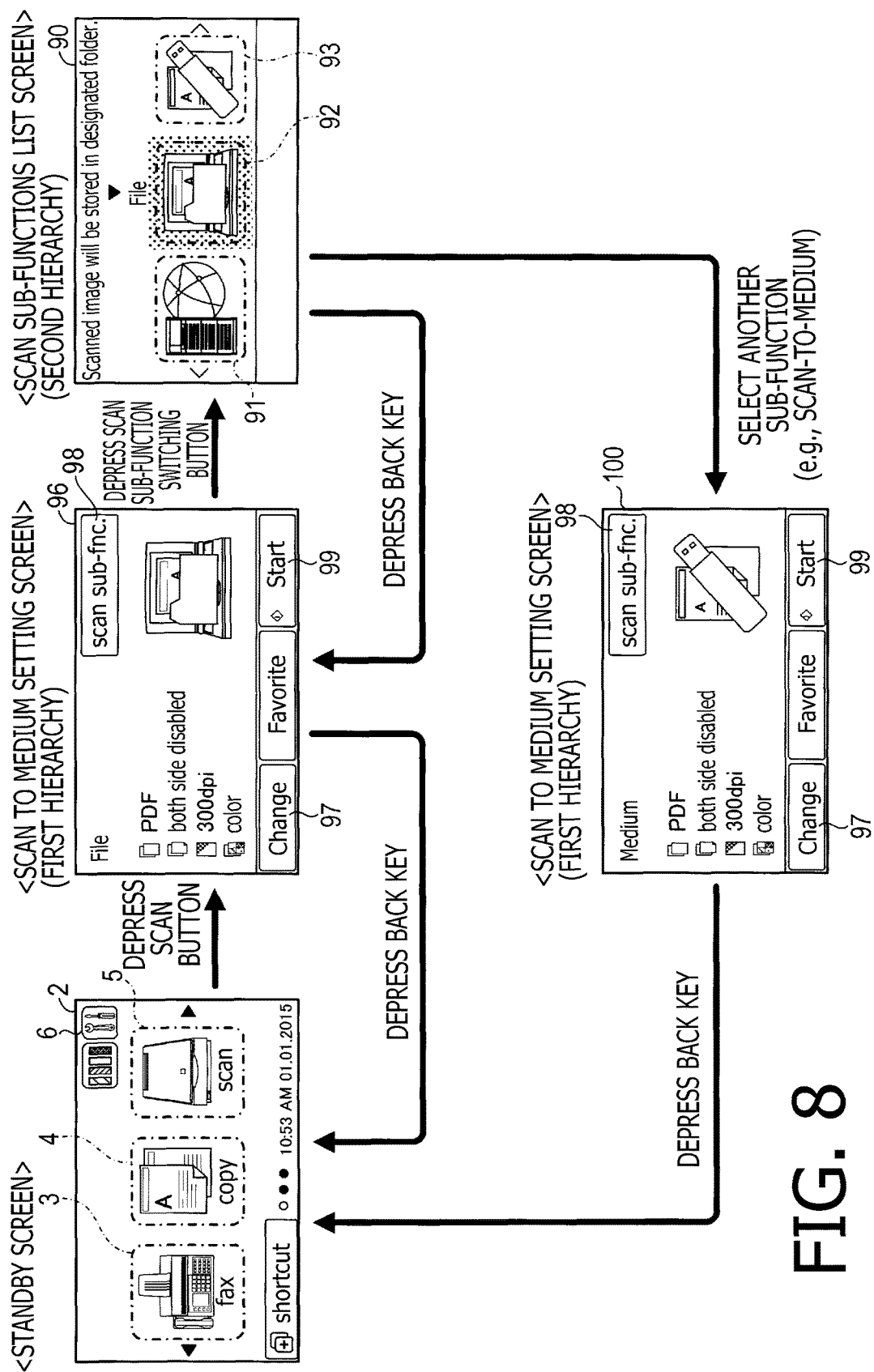
FIG. 8 illustrates a transition of screens when the function home screen is set to be a setting screen for a particular sub-function and the back key is depressed according to the illustrative embodiment of the disclosures.

When the scan-to-file setting screen 96 is set as the scan home screen (first hierarchy) for the scanning function, as shown in FIG. 8, by depressing the scan button 5, the scan-to-file setting screen 96 which is the scan home screen is displayed. When the back key 22 is depressed with the scan-to-file setting screen 96 being displayed, the screen returns to the standby screen 2 which belongs to a higher hierarchy by one level, and is also the previous screen.

After transition from the standby screen 2 to the scan-to-file setting screen 96, when the scan sub-function switching button 98 is depressed, the scan sub-functions list screen 90 is displayed as the second hierarchy screen.

When the back key 22 is depressed with the scan sub-functions list screen 90 being displayed, the screen returns to the scan-to-file setting screen 96 which is a higher hierarchy screen by one level, and is also the previous screen. When one of the multiple sub-function buttons, for example the scan-to-medium button 93 is depressed in the scan sub-functions list screen 90, the scan-to-medium setting screen 100 is displayed.

It is noted that, since the scan-to-file setting screen 96 is set as the scan home screen, as mentioned above, all the setting screens, including the scan-to-file setting screen 96, of the sub-functions for the scanning function are set to the first hierarchy screens. Therefore, the scan-to-medium setting screen 100 is also set as the first hierarchy screen similar to the scan-to-file setting screen, although the scan-to-medium setting screen 100 is not a scan home screen.

Accordingly, when the back key 22 is depressed after the transition from the scan sub-functions list screen 90 (second hierarchy) to the scan-to-medium setting screen 100 (first hierarchy), the screen does not return to the scan-to-file setting screen 96 which was previously displayed, but returns to the standby screen 2 which belongs to the higher hierarchy by one level.

In the above description, transition of screens are described when the back key 22 is depressed, referring to FIGS. 7 and 8. It is noted that in the copying function or other main functions, similar transitions of screens will occur.

(4) Function Home Screen Setting Process

Figure 9:
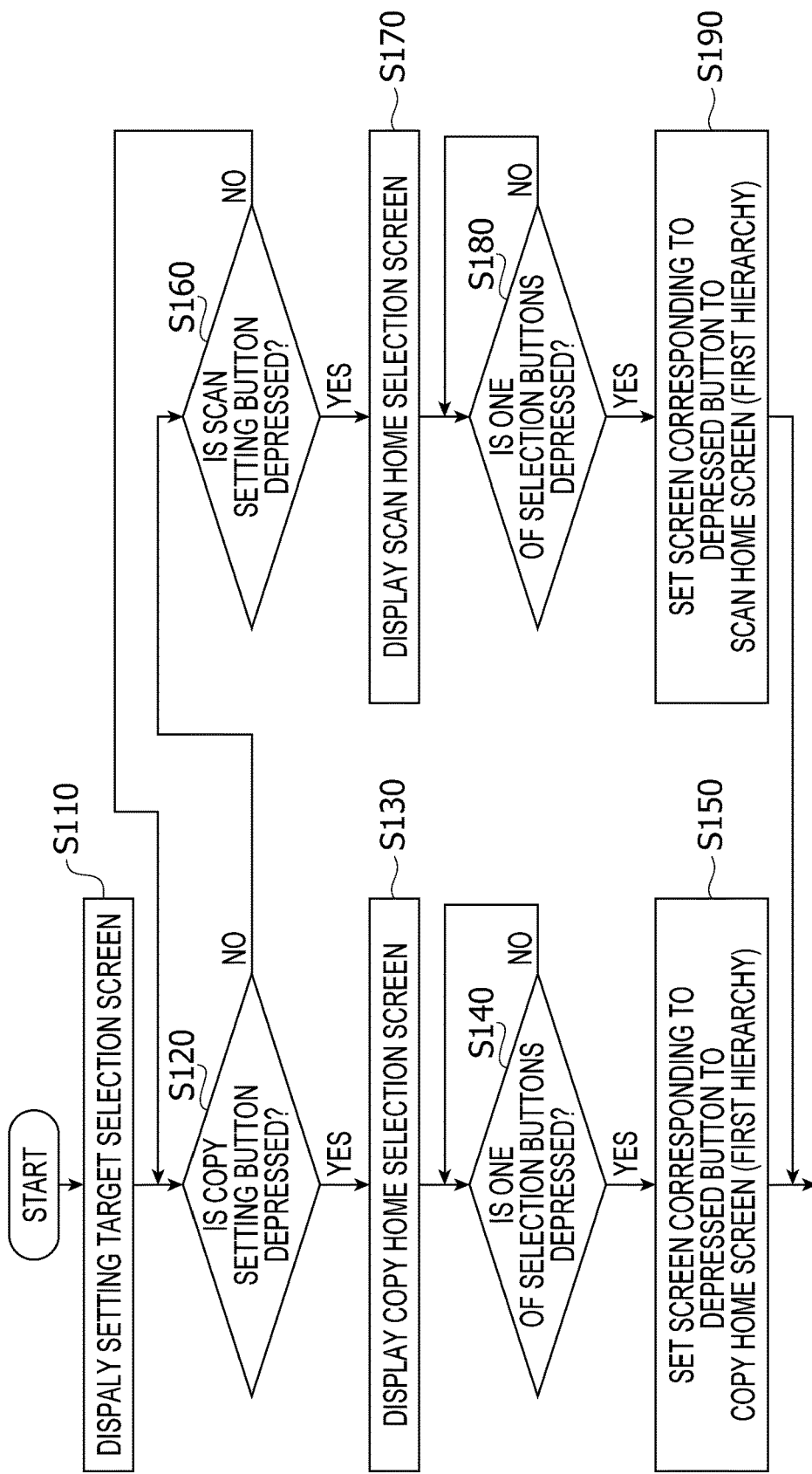
FIG. 9 is a flowchart illustrating a function home screen setting process according to the illustrative embodiment of the disclosures.

FIG. 9 shows a flowchart illustrating the function home screen setting process which is mentioned when FIG. 2 is described. When the initial screen setting button 42 is depressed in the setting list screen 40, the CPU 11 of the MFP 10 retrieves a program of the function home screen setting process from the NVRAM 14 or the RAM 12, and executes the same.

When the function home screen setting process is started, the CPU 11 displays the setting target selection screen (FIG. 2) on the display. When the function home screen setting process is started, the CPU 11 displays the setting target selection screen (see FIG. 2) on the display 24 in S110. Then, the CPU 11 determines whether the copy setting button 46 is depressed in the selection target setting screen 45 (S120). When it is determined that the copy setting button 46 is depressed (S120: YES), the CPU 11 displays the copy home selection screen 50 (see FIG. 2) on the display 24.

In S140, the CPU 11 determines whether one of the multiple buttons for selection as the copy home screen shown in the copy home selection screen 50. S140 is repeatedly executed until one of the buttons is depressed. It is noted that, when the back key 22 is depressed, the screen returns to the setting target selection screen 45. The process when the back key 22 is depressed is omitted in FIG. 9.

When one of the selection buttons for selecting the copy home screen is depressed in the copy home selection screen 50 (S140: YES), the CPU 11 proceeds to S150. In S150, the CPU 11 sets the screen corresponding to the depressed selection button to be the first hierarchy copy home screen for the copying function.

When it is determined that the copy setting button 46 is not depressed (S120: NO), the CPU 11 determines whether the scan setting button 47 is depressed in the setting target selection screen 45 (S160). When it is determined that the scan setting button 47 is not depressed (S160: NO), the CPU 11 returns to S120. When it is determined that the scan setting button 47 is depressed (S160: YES), the CPU 11 displays the scan home selection screen 60 (see FIG. 2) on the display 24 (S170).

In S180, the CPU 11 determines whether one of the multiple buttons listed for selecting the scan home screen is depressed in the scan home selection screen 60. Until one of the buttons is depressed (S180: NO), S180 is repeated. When one of the buttons is depressed (S180: YES), the CPU 11 proceeds to S190. In S190, the CPU 11 sets the screen corresponding to the depressed button to be the first hierarchy scan home screen for the scanning function.

(5) Function Execution Process

Figure 10:
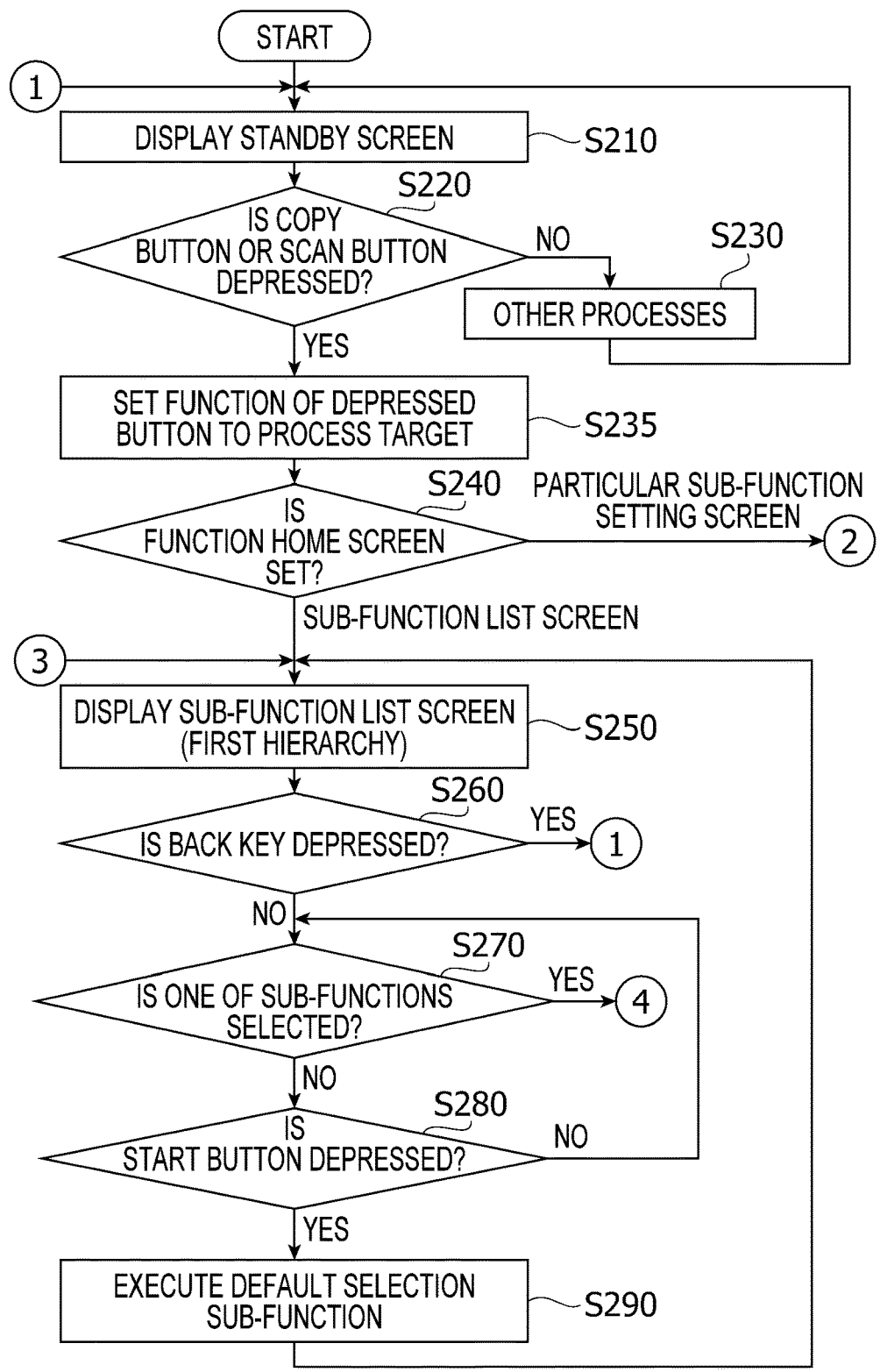
FIGS. 10, 11 and 12 show a flowchart illustrating a function execution process according to the illustrative embodiment of the disclosures.
Figure 11:
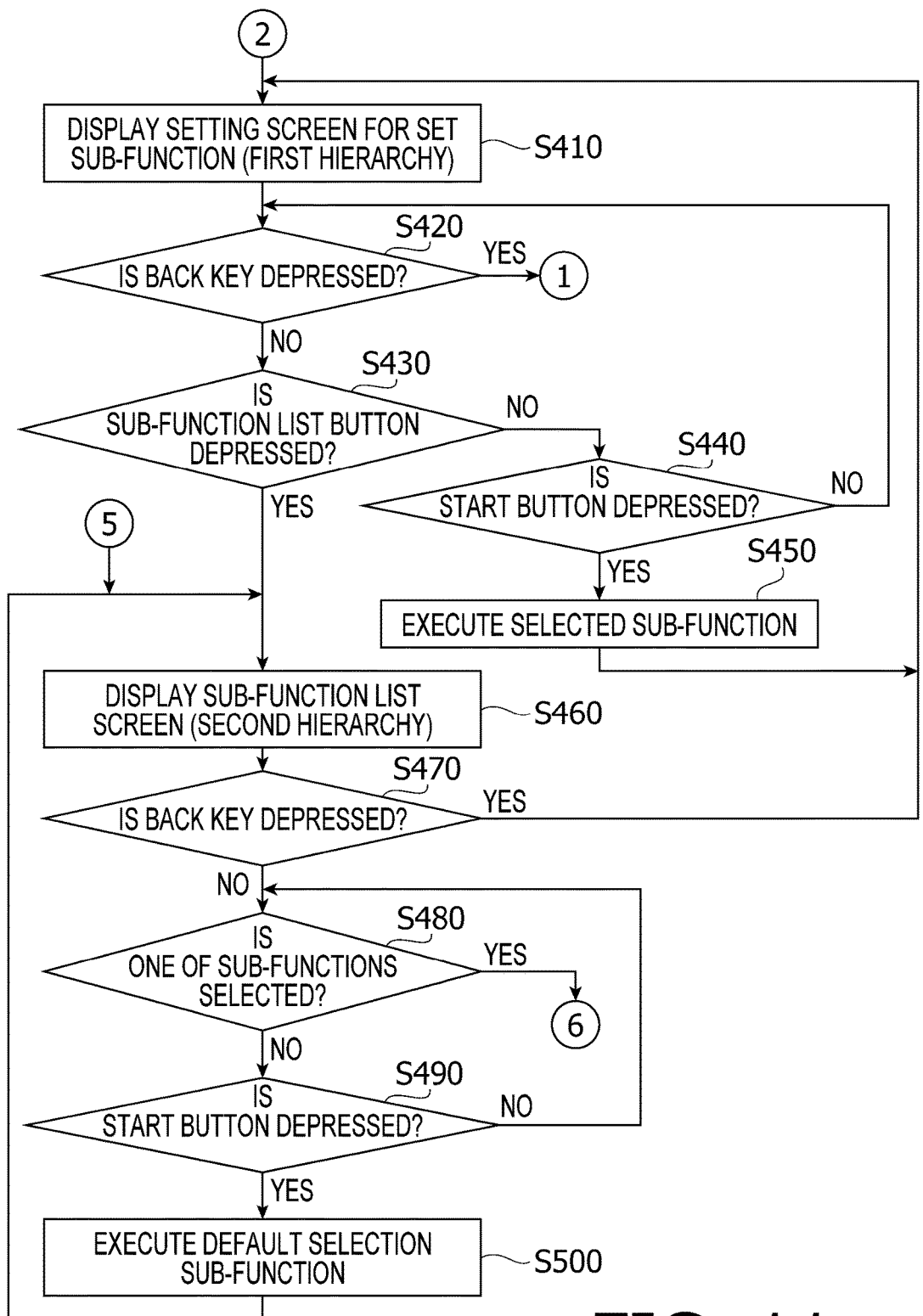
Figure 12:
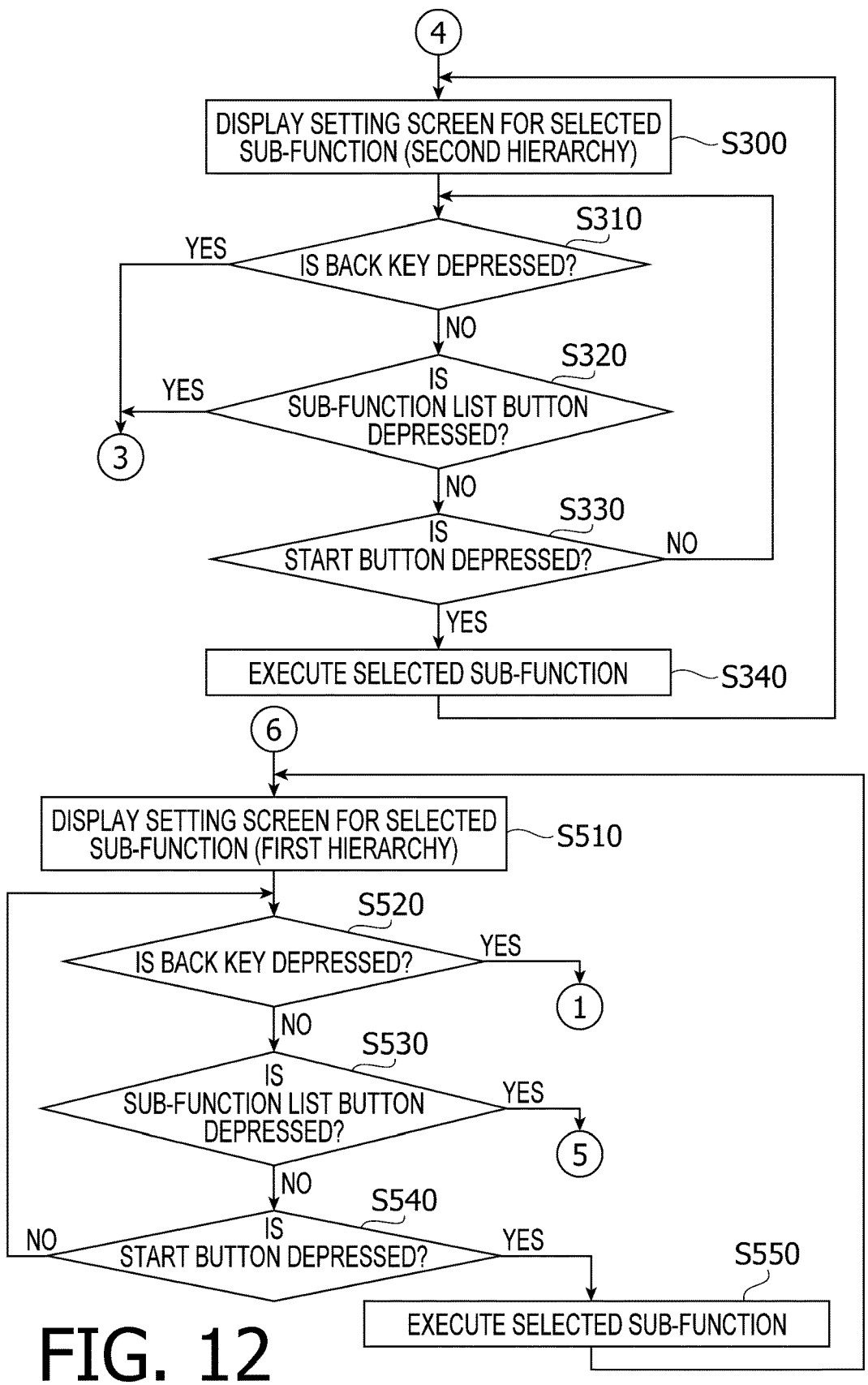

FIGS. 10, 11 and 12 shown a flowchart illustrating a function execution process executed by the CPU 11. The function execution process includes processes realizing screen transitions which are described with reference to FIGS. 3-8. In the following description on the function execution process, processes for screen transitions are mainly described, while processes other than the screen transitions will not be described in detail for brevity.

When the MFP 10 is powered on, the CPU 11 retrieves a program for the function execution process shown in FIGS. 11-12 from the NVRAM 14 or ROM 12, and executes the same. When the function execution process is started, the CPU 11 displays the standby screen 2 (see FIG. 3) on the display 24 (S210).

In S220, the CPU 11 determines whether the copy button 4 or the scan button 5 is depressed in the standby screen. When it is determined that none of the copy button 4 and the scan button 5 is depressed (S220: NO), the CPU 11 executes other processes corresponding to the user operation in S230, and returns to S210.

It is noted that a process in S230 includes a process which is executed when the menu button 6 is depressed in the standby screen 2. That is, when the menu button 6 in the standby screen 2 is depressed, the CPU 11 displays the setting list screen (see FIG. 2) in S230. Then, when the initial screen setting button 42 is depressed in the setting list screen 40, the CPU 11 displays the setting target selection screen 45 (see FIG. 2). Further, when the setting target selection screen 45 is displayed, the CPU 11 executes the function home screen setting process shown in FIG. 9.

When it is determined that the copy button 4 or the scan button 5 is depressed in the standby screen 2 (S220: YES), the CPU sets a function corresponding to the depressed function button as the processing target (S235), and proceeds to S240. For example, when the copy button 4 is depressed, the CPU 11 sets the copy function as the processing target, while the CPU 11 sets the scanning function as the processing target when the scan button 5 is depressed.

In S240, the CPU 11 determines which of the sub-functions list screen and a setting screen for a particular sub-function is set to be the function home screen. For example, when the copying function is set to be the processing target, which of the copy sub-functions list screen and the setting screen for the particular sub-function of the copying function is determined in S240.

When the sub-functions list screen is set as the function home screen, the CPU 11 proceeds to S250. In S250, the CPU 11 displays the sub-functions list screen as the first hierarchy function home screen. For example, when the copying function is set, the copy sub-functions list screen 70 (see FIG. 3) is displayed in S250.

In S260, the CPU 11 determines whether the back key 22 is depressed. When it is determined that the back key 22 is depressed (S260: YES), the CPU 11 returns to S210. That is, in this case, the screen transits to the standby screen 2. When it is determined that the back key 22 is not repressed (S260: NO), the CPU 11 determines whether one of the sub-functions is selected (i.e., whether one of the multiple sub-function buttons listed in the right-left direction is depressed) in S270.

When none of the sub-functions is selected (S270: NO), the CPU 11 determines whether the start button is depressed in S280. When it is determined that the start button is not depressed (S280: NO), the CPU 11 returns to S270. When it is determined that the start button is depressed (S280: YES), the CPU 11 executes a sub-function which is selected as a default selection (i.e., the sub-function which is in a selected state in the sub-functions list screen) in S290. For example, when the copying function is set as the processing target, a sub-function that is in a selected state in the copy sub-functions list screen 70 (e.g., the standard copy in the example of FIG. 3) is executed in S290. After execution of S290, the CPU 11 returns to S250.

When it is determined that one of the sub-functions is selected (S270: YES), the CPU 11 displays the setting screen of the selected sub-function as the second hierarchy screen in S300. For example, when the copying function is selected as the processing target and when the standard copy button 72 is depressed in the copy sub-functions list screen 70, the CPU 11 displays the standard copy setting screen 76 (see FIG. 3) in S300.

In S310, the CPU 11 determines whether the back key 22 is depressed. When it is determined that the back key 22 is depressed (S310: YES), the CPU 11 returns to S250. In this case, the screen transits to the sub-functions list screen which is the first hierarchy screen (higher hierarchy than the current screen by one level) and is also the previously displayed screen.

When it is determined that the back key 22 is not depressed (S310: NO), the CPU 11 determines whether the sub-functions list button is depressed in S320. For example, when the copying function is selected as the processing target, the CPU 11 determines whether the copy sub-functions list button 78 is depressed in S320.

When it is determined that the sub-functions list button is depressed (S320: YES), the CPU 11 returns to S250. In this case, the screen transits to the sub-functions list screen which is the first hierarchy screen. When it is determined that the sub-functions list button is note depressed (S320: NO), the CPU 11 determines whether the start button is depressed in S320. When it is determined that the start button is not depressed (S330: NO), the CPU 11 returns to S310. When it is determined that the start button is depressed (S330: YES), the CPU 11 executes the sub-function currently selected in S340. After execution of S340, the CPU 11 displays again the sub-function setting screen which was displayed before the function is executed.

When it is determined that the setting screen for the particular sub-function is set as the function home screen in S240, the CPU 11 proceeds to S410 (FIG. 11). In S410, the CPU 11 displays the setting screen for the sub-function which is set as the first hierarchy function home screen. For example, when the copying function is set as the processing target and the standard copy setting screen 76 is set as the copy home screen, the standard copy setting screen 76 is displayed as shown in FIG. 4.

In S420, the CPU 11 determines whether the back key 22 is depressed. When it is determined that the back key 22 is depressed (S420: YES), the CPU 11 returns to S210. That is, in this case, the screen transits to the standby screen 2.

When it is determined that the back key 22 is not depressed (S420: NO), the CPU 11 determines whether the sub-functions list button is depressed in S430. When it is determined that the sub-functions list button is not depressed (S430: NO), the CPU 11 determines whether the start button is depressed in S440. When it is determined that the start button is not depressed (S440: NO), the CPU 11 returns to S420. When it is determined that the start button is depressed (S440: YES), the CPU 11 executes the currently selected sub-function in S450. After execution of S450, the CPU 11 returns to S410 and displays the setting screen for the sub-function which was displayed before execution of S450.

When it is determined that the sub-functions list button is depressed (S430: YES), the CPU 11 displays the sub-functions list screen as the second hierarchy screen. In S470, the CPU 11 determines whether the back key 22 is depressed. When it is determined that the back key 22 is depressed (S470: YES), the CPU 11 returns to S410. That is, in such a case, the screen transits to the first hierarchy screen which has a higher hierarchy by one level. Further, in such case, the screen transits to the previous screen as it was the first hierarchy screen. For example, when the back key 22 is depressed under a state where the copy sub-functions list button 78 was depressed in the standard copy setting screen 76 (first hierarchy) and the copy sub-functions list screen 70 (second hierarchy) is displayed, the screen transits to the standard copy setting screen 76 which was previously displayed from among the sub-function setting screens fallen within the first hierarchy screens.

When it is determined that the back key 22 is not depressed (S470: NO), the CPU 11 determines whether one of the sub-functions is selected in S480. When it is determined that none of the sub-functions is selected (S480: NO), the CPU 11 determines whether the start button is depressed in S490. When it is determined that the start button is not depressed (S490: NO), the CPU 11 returns to S480. When it is determined that the start button is depressed (S490: YES), the CPU 11 executes the sub-function currently being selected in the sub-functions list screen, that is the default setting sub-function in S500. After execution of S500, the CPU 11 returns to S460.

When it is determined that one of the sub-functions is selected (S480: YES), the CPU 11 displays the setting screen for the selected sub-functions in S510. In this case, since the setting screen of the sub-function is set as the function home screen (first hierarchy), the screen transits from the second hierarchy to the first hierarchy.

In S520, the CPU 11 determines whether the back key 22 is depressed. When it is determined that the back key 22 is depressed (S520: YES), the CPU 11 returns to S210. That is, in this case, the screen transits to the highest hierarchy screen of the standby screen 2 than the current screen which is the first hierarchy screen.

When it is determined that the back key 22 is not depressed (S520: NO), the CPU 11 determines whether the sub-functions list button is depressed (S530). When it is determined that the sub-functions list button is depressed (S530: YES), the CPU 11 returns to S460. In this case, the screen transits to the sub-functions list screen which is the lower hierarchy screen than the current screen by one level. When it is determined that the sub-functions list button is not depressed (S530: NO), the CPU 11 determines whether the start button is depressed in S540. When it is determined that the start button is not depressed (S540: NO), the CPU 11 returns to S520. When it is determined that the start button is depressed (S540: YES), the CPU 11 executes the currently selected sub-function in S550. After execution of the sub-function, the CPU 11 returns to S510 and displays the setting screen of the sub-function which was previously displayed.

(6) Effects of Illustrative Embodiment

According to the MFP 10 described above, it is possible to determine, in advance, one of the sub-functions list screen of setting screens for respective sub-functions as the first hierarchy function home screen to be displayed when a main function is selected in the standby screen 2. Further, when the main function is selected in the standby screen 2, a screen set to be the first hierarchy function home screen corresponding to the selected main function is displayed. For example, if the copy sub-functions list screen 70 is set as the function home screen corresponding to the copying function, the copy sub-functions list screen 70 can be displayed in response to depression of the copy button 4 in the standby screen 2. On the other hand, if, for example, the standard copy setting screen 76 which is one of the particular sub-functions is set as the function home screen corresponding to the copying function, the standard copy setting screen 76 can be displayed in response to depression of the copy button 4 in the standby screen 2.

Therefore, for example, if the frequently used copy sub-function in the copying function is known, by setting the setting screen for the frequently used copy sub-function as the first hierarchy copy home screen, the copy sub-function can be executed without displaying the copy sub-functions list screen 70.

Therefore, according to the MFP 10, screen can be transited to appropriate one when the main function is selected in the standby screen 2, which improves operability.

In the setting screen of each of the sub-functions, a start button is included. For example, in the standard copy setting screen 76, the start button 79 is displayed, and the scan-to-file setting screen 96 has the start button 99. With this configuration, the user can immediately execute the displayed sub-function in a state where the sub-function setting screen is displayed. Therefore, if the setting screen for the particular sub-function is set as the first hierarchy function home screen, the particular sub-function can be executed quickly with relatively small number of procedures.

When setting of the first hierarchy function home screen is executed, by displaying the function home selection screen corresponding to the particular main function through the setting target selection screen 45 (see FIG. 2), setting of the first hierarchy function home screen can be executed through the function home selection screen. For example, the function home selection screen corresponding to the copying function is the copy home selection screen 50 shown in FIG. 2, and the function home selection screen corresponding to the scanning function is the scan home selection screen 60 shown in FIG. 2.

In the function home selection screen, buttons corresponding to respective screens and can be set as the function home screen are listed. By depressing one of the buttons, the user can set the first hierarchy function home screen. Accordingly, the user can easily set the first hierarchy function home screen without fail.

Further, the setting target selection screen 45 can be displayed with only two button operations from the standby screen 2. That is, as shown in FIG. 2, by transiting the screen from the standby screen 2 to the setting list screen 40 and then by depressing the initial screen setting button 42 displayed in the setting list screen 40, the screen can be transited to the setting target selection screen 45. In view of hierarchy, it is regarded that the setting target selection screen 45 is lower than the standby screen 2 by two levels. Accordingly, the setting target selection screen 45 can be displayed quickly, and thus setting of the function home screen quickly.

Further, according to the illustrative embodiment, when the sub-functions list screen is displayed as the first hierarchy screen, the setting screens for respective sub-functions can be regarded as the second hierarchy screens, which is below the first hierarchy screen by one level. Therefore, if the sub-functions list screen is set as the first hierarchy screen (i.e., the function home screen), the user can appropriately selects the sub-function the user wishes to execute. Further, the user can confirm the concrete settings of the selected sub-function through the setting screen which is in the lower hierarchy by one level.

When the setting screen for the particular sub-function is set as the first hierarchy screen, the sub-functions list screen is defined as the second hierarchy screen. In this case, the screen can be transited from the setting screen for the particular sub-function to the sub-functions list screen. Accordingly, by transiting the screen from the setting screen for the particular sub-function to the sub-functions list screen, the sub-functions can be switched to one which should be executed, and then display the setting screen for the switched sub-function.

In the MFP 10 according to the illustrative embodiment, by depressing the back key 22, the screen displayed on the display 24 can be returned to from the currently displayed screen to one of a higher hierarchy by one level. That is, the back key 22 is basically used as a key to return the screen to the previously displayed screen. However, as described above, transition of the screens to the higher hierarchy has priority with respect to the previous screen. Therefore, when the screens are transited from the first hierarchy screen to the second hierarchy screen, the screen returns to the first hierarchy screen in response to depression of the back key 22. However, when the screens are transited from the second hierarchy screen to the first hierarchy screen and the back key 22 is depressed, the screen does not transit to the previous screen (i.e., the second hierarchy screen) but to a screen which has a higher hierarchy than the currently displayed screen (i.e., the first hierarchy screen). According to the illustrative embodiment, the screen having a higher hierarchy than the first hierarchy screen is the standby screen 2. Thus, in the above case, the screen transits from the first hierarchy screen to the standby screen 2.

As above, regardless of process of transitions and/or contents of the previously displayed screen, priority is given in transiting the screen to the higher hierarchy screen by one level in response to depression of the back key 22. Accordingly, the user can recognize the transition of the screens easily.

It is noted that the display 24 in the illustrative embodiment is an example a display device set forth in the claims. At least one of the ROM 12 and the NVRAM 14 is an example of the storage device set forth in the claims. The CPU 11 of the MFP 10 is an example of the controller set forth in the claims. Further, the printing device 16 in the illustrative embodiment is an example of an image forming device set forth in the claims. Steps S150 and S190 are an example of the first hierarchy setting process set forth in the claims. S210 is an example of the function displaying process set forth in the claims.

It is noted that a process in S220 corresponds to an example of a function selection process set forth in the claims. Processes in S250 and S410 correspond to examples of a first displaying process set forth in the claims. Steps S330, S440 and S540 are examples of execution selection process set forth in the claims. Further, steps S130 and S170 correspond to examples of a selection displaying process set forth in the claims. Steps S140 and S180 correspond to examples of a first hierarchy inputting process set forth in the claims. Further, S230 corresponds to an example of the setting image selecting process set forth in the claims. Processes in S270 and S480 are examples of a function item selecting process set forth in the claims. Furthermore, S300 and S460 are examples of a second displaying process set forth in the claims. It is noted that steps S430 and S530 are examples of a list switch selecting process set forth in the claims. Further, step S510 is an example of a third displaying process set forth in the claims. Processes in S260, S310, S420, S470 and S520 are examples of a returning operation acquiring process set forth in the claims. Further, steps S210, S250 and S410, which are executed in response to depression of the back key 22 are examples of a screen returning process.

Other Embodiments

An illustrative embodiment according to the present disclosures is described. However, the inventions set forth in the claims should not be limited to those disclosed as the illustrative embodiment, but can be modified in various ways without departing from the aspects of the disclosures. Such examples will be described below.

(1) According to the above-described illustrative embodiment, the initial screen setting button 42 for displaying the setting target selection screen 45 is displayed in the setting list screen 40. This configuration may be modified such that the initial screen setting button 42 is displayed in the standby screen 2 or any other screen. If the initial screen setting button 42 is displayed in the standby screen 2, transition of the screen from the standby screen 2 to the setting target selection screen 45 quickly, and the user can set the function home screen further quickly.

(2) According to the illustrative embodiment, the setting method of the function home screen, transition of the screens and the like are described based on the examples using the copying function and the scanning function from among the multiple main functions. It is noted that, in the main functions other than the copying function and the scanning function, the function home screen can be set similarly, and transition of screens can be realized based on the settings.

(3) It is noted that the types, shapes, sizes, arrangements and the like of the buttons displayed in the respective screens are only exemplary ones, and other types, shapes, sizes, arrangements and the like can also be employed. Further, in the illustrative embodiment, as the multiple sub-functions for the copying function, the standard copy function, the ID copy function and the like are described. Similarly, as the multiple sub-functions for the scanning function, the scan-to-file function, the scan-to-medium functions and the like are described. Such sub-functions are only illustrative examples, and the MFP may have further sub-functions.

(4) It is noted that aspects of the present disclosures need not be limited to application to the MFP 10. That is, aspects of the present disclosures may be applied to any kinds of function execution apparatuses which has main functions, and multiple sub-functions are assigned to each of the main functions.

(5) The above-described illustrative embodiment may be modified such that a function provided by one component in the above-described illustrative embodiment may be provided by multiple components and/or a function provided by a plurality of components may be provided by a single component. Parts of the above-described illustrative embodiment may be omitted. Further, at least a part of the above-described illustrative embodiment may be replaced with well-known components having the same function. A part of the configuration of the above-described illustrative embodiment may be omitted. Further, at least a part of the above-described illustrative embodiment may be modified by adding other components thereto and/or replaced with other components. It is noted that any configuration falling within the scopes of the claims should be regarded as embodiments of the inventions set forth in the claims.

What is claimed is:

1. A display control device for an image processing apparatus having multiple functions, comprising:
    a non-transitory storage medium storing instructions thereon;
    a display device configured to display an image;
    a controller configured to read the instructions in the non-transitory storage medium; and
    a storage device configured to store:
    a function selection screen to select one function of the multiple functions of the image processing apparatus;
    a sub-functions list screen including sub-functions which are related to the one function selected in the function selection screen; and
    a functional item setting screen, which corresponds to individual one of the sub-functions, including at least settings of a corresponding sub-function, the image processing apparatus being configured to execute a process related to the individual one of the sub-functions with using the settings set in the functional item setting screen,
    the instructions causing, when executed by the controller, the display control device to:
    display the function selection screen;
    in response to accepting a selection of a particular sub-function from among the sub-functions displayed on the sub-functions list screen, display the functional item setting screen corresponding to the particular sub-function;
    set one of the sub-functions list screen and the functional item setting screen corresponding to the particular sub-function as a first hierarchy screen and store the setting of the first hierarchy screen in the storage device, the first hierarchy screen being a screen to be displayed on the display device in response to a selection of the one function in the function selection screen;
    in response to accepting a selection of the one function from among the multiple functions displayed on the function selection screen, while the setting of the first hierarchy screen has been stored in the storage device,
    display the sub-functions list screen when the sub-functions list screen has been set as the first hierarchy screen in the stored setting in the storage device; and
    display the functional item setting screen corresponding to the particular sub-function, when the functional item setting screen has been set as the first hierarchy screen in the stored setting in the storage device without displaying the sub-functions list screen after the selection of the one function and before displaying the function item setting screen.

2. The display control device according to claim 1, wherein:
    the functional item setting screen includes function execution instruction images to execute processes of the corresponding items, respectively; and
    the instructions further causing, when executed by the controller, the display control device to:
    receive a selection operation to select the function execution instruction images included in the functional item setting screen which is displayed on the display device; and
    when the function execution instruction images is selected, execute the function item corresponding to the selected function execution instruction images.

3. The display control device according to claim 1, wherein:
    the storage device stores a first hierarchy selection screen to select which one of the sub-functions list screen and the functional item setting screen is to be displayed as the first hierarchy screen;
    the instructions further causing, when executed by the controller, the display control device to:
    retrieve the first hierarchy selection screen from the storage device and display the retrieved first hierarchy selection screen on the display device; and
    receive an input operation by the user to select one of the sub-functions list screen and the functional item setting screen; and
    set the selected one of the sub-functions list screen and the functional item setting screen as the first hierarchy screen.

4. The display control device according to claim 3, wherein:
    the first hierarchy selection screen include a first selection image related to the sub-functions list screen and multiple second selection screens related to each of the multiple function items;
    the display control device receives a selection operation to select one of the first selection image and the second selection image,
    the instructions further causing, when executed by the controller, the display control device to set a screen corresponding to the selected image as the first hierarchy screen.

5. The display control device according to claim 3, wherein:
    a menus list screen including multiple kinds of setting menus is stored in the storage device;

the function selection screen includes a menu setting image to display the menus list screen on the display device;

the instructions further causing, when executed by the controller, the display control device to:
  receive a selection operation to select the menu setting image displayed on the function selection screen;
  retrieve the menus list screen from the storage device and display the retrieved menus list screen on the display device when the menu setting image is selected; and
  receive selection operation to select one of the multiple kinds of setting menus in the menus list screen displayed on the display device;
the menus list screen includes a first hierarchy setting menu to receive selection of the first hierarchy selection screen as the setting menu; and
the instruction further causing, when executed by the controller, the display control device to display the first hierarchy selection screen when the first hierarchy setting menu is selected.

6. The display control device according to claim 1, wherein the instructions further causing, when executed by the controller, the display control device to:
receive a selection operation to select one of the functional items through the sub-functions list screen, when the sub-functions list screen is displayed; and
when one of the functional items is selected, retrieve the functional item setting screen corresponding to the selected functional item from the storage device and display the retrieved functional item setting screen on the display device as a second hierarchy screen which is lower than the sub-functions list screen by one level.

7. The display control device according to claim 1, wherein:
  the functional item setting screen includes a list switching image to switch a screen to be displayed on the display device to the function items list screen;
  the instructions further causing, when executed by the controller, the display control device to:
  when the functional item setting screen is displayed, receive a selection operation of the list switching image displayed on the functional item setting screen;
  when the list switching image is selected, retrieve the sub-functions list screen which is a second hierarchy screen one level lower than the function item setting screen from the storage device and display the retrieved sub-functions list screen;
  when the sub-functions list screen is displayed, receive a selection operation of one of the functional items on the sub-functions list screen; and
  when one of the functional items is selected, retrieve the functional item setting screen related to the selected functional item and display the retrieved functional item setting screen on the display device.

8. The display control device according to claim 7, the instructions further causing, when executed by the controller, the display control device to:
  receive a screen returning operation to change the screen displayed on the display device from the currently displayed screen to a higher hierarchy screen which is in a higher hierarchy by one level; and
  when the display control device receives the screen returning operation, return the screen to be displayed on the display device from the currently displayed screen to the higher hierarchy screen of which hierarchy is higher than the currently displayed screen by one level,
  wherein, when the display control device receives the screen returning operation while the functional item setting screen is displayed, retrieve the function selection screen which is a higher hierarchy screen with respect to the functional item setting screen by one level from the storage device and display the retrieved function selection screen on the display device.

9. The display control device according to claim 1, wherein the image processing apparatus comprises:
  an image scanning device configured to scan an image on an original sheet; and
  an image forming device configured to form an image on a recording sheet,
  wherein the multiple functions of the image processing apparatus include at least:
  an image scanning function in which the controller causes the image scanning device to scan an image on the original sheet and generate image data representing the scanned image; and
  an image forming function in which the controller causes the image forming device to form the image represented by the image data on a recording sheet.

10. A non-transitory computer-readable medium for a display control device for an image processing apparatus having multiple functions, the display control device having a display device configured to display an image, a storage device configured to store a function selection screen to select one function of the multiple functions of the image processing apparatus, a sub-functions list screen including sub-functions which are related to the one function selected in the function selection screen, and a functional item setting screen, which corresponds to individual one of the sub-functions, including at least settings of a corresponding sub-function, where the image processing apparatus is configured to execute a process related to the individual one of the sub-functions with using the settings set in the functional item setting screen, and a processor, the non-transitory computer-readable medium containing instructions which, when executed by the processor, causes the display control device to:
  display the function selection screen;
  in response to accepting a selection of a particular sub-function from among the sub-functions displayed on the sub-functions list screen, display the functional item setting screen corresponding to the particular sub-function;
  set one of the sub-functions list screen and the functional item setting screen corresponding to the particular sub-function as a first hierarchy screen, and store the setting of the first hierarchy screen in the storage device, the first hierarchy screen being a screen to be displayed on the display device in response to a selection of the one function in the function selection screen;
  in response to accepting a selection of one function from among the multiple functions displayed on the function selection screen, while the setting of the first hierarchy screen has been stored in the storage device,
    display the sub-functions list screen when the sub-functions list screen has been set as the first hierarchy screen in the stored setting in the storage device; and
    display the functional item setting screen corresponding to the particular sub-function, when the functional item setting screen has been set as the first hierarchy screen in the stored setting in the storage device without displaying the sub-functions list screen after the selection of the one function and before displaying the function item setting screen.

11. A display control device for an image processing apparatus having multiple functions, comprising:
   a display;
   a controller; and
   a storage storing first data for displaying a first screen on the display, second data for displaying a second screen on the display and third data for displaying a third screen on the display, the first screen indicating the multiple functions of the image processing apparatus, the second screen indicating a list of sub-functions related to a particular function, the particular function being one of the multiple functions, the third screen indicating settings of a particular sub-function, the particular sub-function being one of the sub-functions, the image processing apparatus being configured to execute a process related to the particular sub-function with using settings set in the third screen;
   wherein the controller is configured to:
      display the first screen;
      in response to accepting a selection of a particular sub-function from among the sub-functions displayed on the second screen, display the third screen corresponding to the particular sub-function;
      set one of the second screen and the third screen corresponding to the particular sub-function as a first hierarchy screen, and store the setting of the first hierarchy screen in the storage, the first hierarchy screen being a screen to be displayed on the display in response to a selection of one function in the first screen;
      in response to accepting a selection of the function from among the multiple functions displayed on the first screen, while the setting of the first hierarchy screen has been stored in the storage
         displaying the second screen when the second screen has been set as the first hierarchy screen in the stored setting in the storage;
         displaying the third screen corresponding to the particular sub-function, when the third screen has been set as the first hierarchy screen in the stored setting in the storage without displaying the second screen after the selection of the function and before the display of the third screen.

* * * * *